(12) United States Patent
Pack et al.

(10) Patent No.: US 9,329,598 B2
(45) Date of Patent: May 3, 2016

(54) SIMULTANEOUS LOCALIZATION AND MAPPING FOR A MOBILE ROBOT

(71) Applicant: iRobot Corporation, Bedford, MA (US)

(72) Inventors: Robert Todd Pack, Hollis, NH (US);
Scott R. Lenser, Waltham, MA (US);
Justin H. Kearns, Somerville, MA (US);
Orjeta Taka, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/685,029

(22) Filed: Apr. 13, 2015

(65) Prior Publication Data

US 2015/0212521 A1 Jul. 30, 2015

Related U.S. Application Data

(63) Continuation of application No. 13/900,767, filed on May 23, 2013, now Pat. No. 9,037,396.

(51) Int. Cl.
| | | |
|---|---|---|
| G01C 21/00 | (2006.01) | |
| G05D 1/02 | (2006.01) | |
| G01C 21/30 | (2006.01) | |
| G01C 21/20 | (2006.01) | |

(52) U.S. Cl.
CPC .............. *G05D 1/0231* (2013.01); *G01C 21/20* (2013.01); *G01C 21/30* (2013.01); *G05D 1/0214* (2013.01); *Y10S 901/01* (2013.01); *Y10S 901/47* (2013.01)

(58) Field of Classification Search
None
See application file for complete search history.

(56) References Cited

U.S. PATENT DOCUMENTS

| | | |
|---|---|---|
| 4,628,453 A | 12/1986 | Kamejima et al. |
| 4,942,539 A | 7/1990 | McGee et al. |
| 4,954,962 A | 9/1990 | Evans, Jr. et al. |
| 5,040,116 A | 8/1991 | Evans, Jr. et al. |
| 5,109,425 A | 4/1992 | Lawton |
| 5,111,401 A | 5/1992 | Everett, Jr. et al. |
| 5,144,685 A | 9/1992 | Nasar et al. |
| 5,155,775 A | 10/1992 | Brown |
| 5,170,352 A | 12/1992 | McTamaney et al. |
| 5,321,614 A | 6/1994 | Ashworth |
| 5,517,419 A | 5/1996 | Lanckton et al. |
| 5,525,882 A | 6/1996 | Asaka et al. |
| 5,525,883 A | 6/1996 | Avitzour |
| 5,581,629 A | 12/1996 | Hanna et al. |
| 5,677,836 A | 10/1997 | Bauer |
| 5,793,934 A | 8/1998 | Bauer |
| 5,957,984 A | 9/1999 | Rencken |
| 6,005,610 A | 12/1999 | Pingali |

(Continued)

OTHER PUBLICATIONS

Stella E. Circirelli et al., "Position Estimation for a Mobile Robot Using Data Fusion Intelligent Control," IEEE, May 1995, p. 565-570.

(Continued)

*Primary Examiner* — Adam Alharbi
(74) *Attorney, Agent, or Firm* — Honigman Miller Schwartz and Cohn LLP

(57) ABSTRACT

A method of localizing a mobile robot includes receiving sensor data of a scene about the robot and executing a particle filter having a set of particles. Each particle has associated maps representing a robot location hypothesis. The method further includes updating the maps associated with each particle based on the received sensor data, assessing a weight for each particle based on the received sensor data, selecting a particle based on its weight, and determining a location of the robot based on the selected particle.

19 Claims, 21 Drawing Sheets

(56) References Cited

U.S. PATENT DOCUMENTS

| | | | |
|---|---|---|---|
| 6,009,359 | A | 12/1999 | El-Hakim et al. |
| 6,243,657 | B1 | 6/2001 | Tuck et al. |
| 6,266,068 | B1 | 7/2001 | Kang et al. |
| 6,269,763 | B1 | 8/2001 | Woodland |
| 6,285,393 | B1 | 9/2001 | Shimoura et al. |
| 6,288,704 | B1 | 9/2001 | Flack et al. |
| 6,301,370 | B1 | 10/2001 | Steffens et al. |
| 6,389,329 | B1 | 5/2002 | Colens |
| 6,427,118 | B1 | 7/2002 | Suzuki |
| 6,459,955 | B1 | 10/2002 | Bartsch et al. |
| 6,496,754 | B2 | 12/2002 | Song et al. |
| 6,532,404 | B2 | 3/2003 | Colens |
| 6,552,729 | B1 | 4/2003 | Di Bernardo et al. |
| 6,594,844 | B2 | 7/2003 | Jones |
| 6,690,134 | B1 | 2/2004 | Jones et al. |
| 6,711,293 | B1 | 3/2004 | Lowe |
| 6,728,635 | B2 | 4/2004 | Hamada et al. |
| 6,771,932 | B2 | 8/2004 | Caminiti et al. |
| 6,781,338 | B2 | 8/2004 | Jones et al. |
| 6,809,490 | B2 | 10/2004 | Jones et al. |
| 6,836,701 | B2 | 12/2004 | McKee |
| 6,898,518 | B2 | 5/2005 | Padmanabhan |
| 6,915,008 | B2 | 7/2005 | Barman et al. |
| 6,917,855 | B2 | 7/2005 | Gonzalez-Banos et al. |
| 6,965,209 | B2 | 11/2005 | Jones et al. |
| 7,015,831 | B2 | 3/2006 | Karlsson et al. |
| 7,031,496 | B2 | 4/2006 | Shimano et al. |
| 7,082,350 | B2 | 7/2006 | Skoog |
| 7,135,992 | B2 | 11/2006 | Karlsson et al. |
| 7,145,478 | B2 | 12/2006 | Goncalves et al. |
| 7,155,308 | B2 | 12/2006 | Jones |
| 7,162,338 | B2 | 1/2007 | Goncalves et al. |
| 7,173,391 | B2 | 2/2007 | Jones et al. |
| 7,177,737 | B2 | 2/2007 | Karlsson et al. |
| 7,196,487 | B2 | 3/2007 | Jones et al. |
| 7,272,467 | B2 | 9/2007 | Goncalves et al. |
| 7,388,343 | B2 | 6/2008 | Jones et al. |
| 7,389,156 | B2 | 6/2008 | Ziegler et al. |
| 7,448,113 | B2 | 11/2008 | Jones et al. |
| 7,571,511 | B2 | 8/2009 | Jones et al. |
| 7,636,982 | B2 | 12/2009 | Jones et al. |
| 7,689,321 | B2 | 3/2010 | Karlsson |
| 7,761,954 | B2 | 7/2010 | Ziegler et al. |
| 7,774,158 | B2 | 8/2010 | Domingues Goncalves et al. |
| 2002/0016649 | A1 | 2/2002 | Jones |
| 2002/0120364 | A1 | 8/2002 | Colens |
| 2003/0007682 | A1 | 1/2003 | Koshizen et al. |
| 2003/0025472 | A1 | 2/2003 | Jones et al. |
| 2003/0030398 | A1 | 2/2003 | Jacobs et al. |
| 2003/0044048 | A1 | 3/2003 | Zhang et al. |
| 2004/0020000 | A1 | 2/2004 | Jones |
| 2004/0049877 | A1 | 3/2004 | Jones et al. |
| 2004/0167670 | A1 | 8/2004 | Goncalves et al. |
| 2004/0167688 | A1 | 8/2004 | Karlsson et al. |
| 2004/0167716 | A1 | 8/2004 | Goncalves et al. |
| 2004/0187457 | A1 | 9/2004 | Colens |
| 2004/0207355 | A1 | 10/2004 | Jones et al. |
| 2005/0067994 | A1 | 3/2005 | Jones et al. |
| 2005/0204717 | A1 | 9/2005 | Colens |
| 2005/0234679 | A1 | 10/2005 | Karlsson |
| 2007/0090973 | A1 | 4/2007 | Karlsson et al. |
| 2007/0266508 | A1 | 11/2007 | Jones et al. |
| 2008/0140255 | A1 | 6/2008 | Ziegler et al. |
| 2008/0155768 | A1 | 7/2008 | Ziegler et al. |
| 2008/0307590 | A1 | 12/2008 | Jones et al. |
| 2010/0049365 | A1 | 2/2010 | Jones et al. |
| 2010/0257690 | A1 | 10/2010 | Jones et al. |
| 2010/0257691 | A1 | 10/2010 | Jones et al. |
| 2010/0263158 | A1 | 10/2010 | Jones et al. |
| 2011/0304633 | A1* | 12/2011 | Beardsley ............ B25J 9/1666 345/474 |
| 2012/0182392 | A1* | 7/2012 | Kearns .................. B25J 11/009 348/46 |
| 2013/0218339 | A1* | 8/2013 | Maisonnier .......... B25J 11/0005 700/257 |
| 2013/0345718 | A1* | 12/2013 | Crawford ............. A61B 17/025 606/130 |
| 2014/0275850 | A1* | 9/2014 | Venkatraman ....... A61B 5/0002 600/301 |

OTHER PUBLICATIONS

G. Dissanayake et al., "A Computationally Efficient Solution to the Simultaneous Localization and Map Building (SLAM) Problem," Proceedings of the 2000 IEEE International Conference on Robotics & Automation (ICRA), Apr. 2000, p. 1009-1014.

S.I. Roumeliotis et al., "Bayesian Estimation and Kalman Filtering: A Unified Framework for Mobile Robot Localization," Proceedings of the IEEE International Conference on Robotics and Automation (ICRA), San Francisco, CA, 2000, p. 2985-2992.

Wolf J. Burgard et al., "Robust Vision-Based Localization for Mobile Robots Using an Image Retrieval System Based on Invariant Features," Proceeding of the 2002 IEEE International Conference on Robotics and Automation, Washington, D.C., May 2002, p. 359-363.

S. Thrun, "Probabilistic Algorithms in Robotics," Technical Report, CMU-CS-00-126, Carnegie Mellon University, Pittsburgh, PA, Apr. 2000, p. 1-18.

S. Thrun, "Robotic Mapping: A Survey," Technical Report, CMU-CS-02-111, Carnegie Mellon University, Pittsburgh, PA, Feb. 2000, p. 1-29.

D. Fox et al., "Particle Filters for Mobile Robot Localization," New York, 2001, p. 401-428.

D. Fox et al., "Markov Localization for Mobile Robots in Dynamic Environments," Journal of Artificial Intelligence Research, vol. 11, 1999, p. 391-427.

David Lowe, "Object Recognition from Local Scale-Invariant Features," Proceedings of the International Conference on Computer Vision, Greece, Sep. 1999, p. 1150-1157.

Olivier Faugeras et al., "Three Views: The Trifocal Geometry," The Geometry of Multiple Images, Cambridge, MA, The MIT Press, 2001, p. 409-500.

R.E. Kalman, "A New Approach to Linear Filtering and Prediction Problems," Transaction of the ASME—Journal of Basic Engineering, vol. 82D, 1960, p. 35-45.

D.G. Lowe, "Local Feature View Clustering for 3D Object Recognition," Proceedings of the IEEE Conference on Computer Vision and Pattern Recognition, Dec. 2001, p. 682-688.

M. Montemerlo et al., "FastSLAM: A Factored Solution to the Simultaneous Localization and Mapping Problem," Proceedings of the American Association for Artificial Intelligence National Conference on Artificial Intelligence, Edmonton, Canada, 2002.

S. Se et al., "Local and Global Localization for Mobile Robots Using Visual Landmarks," Proceedings of the 2001 IEEE International Conference on Intelligent Robots and Systems, Hawaii, 2001, p. 414-420.

S. Se et al., "Mobile Robot Localization and Mapping with Uncertainty Using Scale-Invariant Features," The International Journal of Robotics Research, vol. 21, No. 8, Aug. 2002, p. 735-758.

S. Se et al., "Vision-Based Mobile Robot Localization and Mapping Using Scale-Invariant Features," Proceedings of IEEE International Conference on Robotics and Automation, Seoul, Korea, May 2001, p. 2051-2058.

S. Thrun et al., "A Probabilistic Approach to Concurrent Mapping and Localization for Mobile Robots," Machine Learning, vol. 31, No. 1-3, p. 29-53.

Gasper et al., "Vision-Based Navigation and Environmental Representation with an Omnidirectional Camera," 2000, IEEE, p. 890-898.

Castellanos et al., "Multisensor Fusion for Simultaneous Localization and Map Building," 2001, IEEE, p. 908-914.

Adam et al., "Fusion of Fixation and Odometry for Vehicle Navigation," 1999, IEEE, p. 593-603.

* cited by examiner

SIMULTANEOUS LOCALIZATION AND MAPPING FOR A MOBILE ROBOT

CROSS REFERENCE TO RELATED APPLICATIONS

This U.S. patent application is a continuation of, and claims priority under 35 §120 from, U.S. patent application Ser. No. 13/900,767, filed on May 23, 2013, which is hereby incorporated by reference in its entirety.

TECHNICAL FIELD

This disclosure relates to simultaneous localization and mapping (SLAM) for mobile robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

SUMMARY

One aspect of the disclosure provides a method of localizing a mobile robot. The method includes receiving sensor data (e.g., image data or range data) of a scene about the robot and executing a particle filter having a set of particles. Each particle has associated maps and a robot location hypothesis. The method further includes updating the maps associated with each particle based on the received sensor data, assessing a weight for each particle based on the received sensor data, selecting at least one particle based on its weight, and determining a location of the robot based on the at least one selected particle. In some implementations, the method includes taking the weighted average of the robot location hypothesis (i.e., robot position) of several selected particles (or all of the particles) to provide the robot location.

Implementations of the disclosure may include one or more of the following features. In some implementations, the method includes receiving two-dimensional image data and three-dimensional image data of a scene about the robot. The particle filter may be a Rao-Blackwellized particle filter. Moreover, the method may include associating at least one of a feature map, a variance occupancy grid map, or a ground plane occupancy grid map with each particle.

In some implementations, the method include receiving a three-dimensional point cloud and accumulating cloud points in cells of the variance occupancy grid map based on first and second coordinates of the cloud points. Each cell accumulates a height variance based on a third coordinate of the accumulated cloud points. The method may include receiving a three-dimensional point cloud, identifying ground plane cloud points, fitting a ground plane to the ground plane cloud points, and updating the ground plane occupancy grid map.

The method may include receiving an image of the scene about the robot and instantiating an image pyramid including a set of scaled images. Each scaled image has a scale relative to the received image. The method further includes identifying at least one feature point in the scaled images and updating the feature map. In some examples, the method includes calculating a Harris Corner Score to identify feature points associated with a corner feature of the scene. The method may include selecting feature points as candidate feature points that have at least one of a local maximum Harris Corner Score or a Harris Corner Score substantially equal to the local maximum Harris Corner Score in a threshold area. For example, the method may include selecting feature points as candidate feature points that have at least one of a local maximum Harris Corner Score or a Harris Corner Score within about 20% of the local maximum Harris Corner Score within a 10 pixel radius of the feature point having the local maximum Harris Corner Score. In some examples, the method includes selecting a feature point having local maximum Harris Corner Score as well as neighboring feature points or feature points within a threshold distance of the feature point having the local maximum Harris Corner Score, and discarding any remaining feature points (e.g., to save on processing time).

In some implementations, the method includes selecting a feature point of a scaled image as a key point for tracking and producing a descriptor of that key point. Moreover, the method may include identifying the key point in a subsequent image using the descriptor. The descriptor may include feature points within a threshold distance of the key point on the corresponding scaled image of the key point. In some examples, the method includes sampling feature points of the descriptor, recording a brightness level for each feature point, and normalizing the brightness levels to have a mean of zero and a variance of one. Normalizing the mean to zero, makes the descriptor insensitive or invariant to brightness changes and normalizing the variance to one makes the descriptor insensitive or invariant to contrast changes, both improving feature tracking performance. The method may include blurring the scaled image before sampling the feature points, for example when the feature points are relatively far apart, which makes the descriptor relatively more invariant to rotation. The feature points may be sampled not every pixel, but rather with pixels in between. Moreover, the method may include rotating the feature points by a threshold angle before sampling the feature points. The feature points may be sampled within a threshold area of the scaled image about the key point.

The method may include producing a descriptor for each feature point of a set of feature points. To identify a common key point among first and second images, the method may include comparing feature descriptors of the first and second images. In some examples, the method includes searching respective image pyramids of the first and second images to find the common feature point. The method may include searching within a threshold area of the scaled images of the images pyramids for the common feature point. Moreover, the method may include determining the threshold area based on at least one of a known previous feature point location or a robot drive trajectory.

In some implementations, the method includes identifying a feature point in a received image by computing a Harris Corner Score for every pixel, identifying a pixel having an associated local maximum Harris Corner Score, keeping neighboring pixels or pixels within a threshold distance of the pixel having the associated local maximum Harris Corner Score and discarding remaining pixels. The method may include generating a descriptor of the feature point using an area (a patch) of the image about the feature point. The method may include blurring the image and sampling the image in an area about the feature point. The method may include comparing feature descriptors between image frames to identify the feature point between image frames.

Another aspect of the disclosure provides a mobile robot navigation system that includes a feature tracker executing on a computing processor and receiving image data of a scene about the robot. The feature tracker identifies and tracks at least one feature of the scene across multiple images. The navigation system includes a stereo processor executing on a computing processor. The stereo processor receives image data and provides a point cloud. The navigation system includes a controller executing a particle filter having a set of particles. Each particle has associated maps representing a robot location hypothesis. The controller updates the maps associated with each particle based on the received image data, assesses a weight for each particle based on the received image data, selects a particle based on its weight, and determines a location of the robot based on the selected particle.

In some implementations, the feature tracker communicates first and second coordinates of the identified at least one feature to the controller, and the controller estimates a third coordinate of the at least one feature. The controller may communicate the estimated third coordinate of the at least one feature back to the feature tracker as feedback. The controller may communicate a probable feature location of a feature to the feature tracker for identification and tracking. The feature tracker searches the image data for the feature about the probable feature location.

In some implementations, the particle filter comprises a Rao-Blackwellized particle filter. The maps associated with each particle may include at least one of a feature map, a variance occupancy grid map, or a ground plane occupancy grid map. The controller may update the variance occupancy grid map by accumulating cloud points in cells of the variance occupancy grid map based on first and second coordinates of the cloud points. Each cell accumulates a height variance based on a third coordinate of the accumulated cloud points. The controller may update the ground plane occupancy grid map by identifying ground plane cloud points in the point cloud provided by the stereo processor and fitting a ground plane to the ground plane cloud points.

The feature tracker may scale an image of the scene to instantiate an image pyramid that includes a set of scaled images. The feature tracker identifies at least feature point in the scaled images. The feature tracker may calculate a Harris Corner Score to identify feature points associated with a corner feature of the scene. The feature tracker may select feature points as candidate feature points that have at least one of a local maximum Harris Corner Score or a Harris Corner Score substantially equal to the local maximum Harris Corner Score in a threshold area. In some examples, the feature tracker selects feature points as candidate feature points that have at least one of a local maximum Harris Corner Score or a Harris Corner Score within about 20% of the local maximum Harris Corner Score within a 10 pixel radius of the feature point having the local maximum Harris Corner Score.

In some implementations, the feature tracker selects a feature point of a scaled image as a key point for tracking and produces a descriptor of that key point. The feature tracker may identify the key point in a subsequent image using the descriptor. The descriptor may include feature points within a threshold distance of the key point on the corresponding scaled image of the key point. To create the descriptor, the feature tracker may sample feature points of the descriptor, record a brightness level for each feature point and normalize the brightness levels to have a mean of zero and a variance of one. In some examples, the feature tracker blurs the scaled image and/or rotates the feature points by a threshold angle before sampling the feature points. Moreover, the feature tracker may sample feature points within a threshold area of the scaled image about the key point.

The feature tracker may produce a descriptor for each feature point of a set of feature points, for example, to compare feature descriptors of first and second images to identify a common key point. The feature tracker may searches respective image pyramids of the first and second images to find the common feature point. In some examples, the feature tracker searches within a threshold area of the scaled images of the images pyramids for the common feature point. The feature tracker may determine the threshold area based on at least one of a known previous feature point location or a robot drive trajectory.

Yet another aspect of the disclosure provides a mobile robot that includes a drive system configured to maneuver the robot over a floor surface. The drive system has a forward drive direction. The robot further includes at least one imaging sensor producing image data of a scene about the robot and a controller in communication with the drive system and the at least one imaging sensor. The controller executes a particle filter having a set of particles. Each particle has associated maps representing a robot location hypothesis. The controller updates the maps associated with each particle based on the received image data, assesses a weight for each particle based on the received image data, selects a particle based on its weight, and determines a location of the robot based on the selected particle.

In some implementations, the particle filter is a Rao-Blackwellized particle filter. The maps associated with each particle may include at least one of a feature map, a variance occupancy grid map, or a ground plane occupancy grid map.

The at least one imaging sensor may include first and second stereo cameras. The controller executes a stereo processor that receives image data from the stereo cameras and provides a corresponding point cloud. The controller may update the variance occupancy grid map by accumulating cloud points in cells of the variance occupancy grid map based on first and second coordinates of the cloud points. Each cell accumulates a height variance based on a third coordinate of the accumulated cloud points. In some examples, the controller updates the ground plane occupancy grid map by identifying ground plane cloud points in the point cloud provided by the stereo processor and fitting a ground plane to the ground plane cloud points.

In some implementations, the at least one imaging sensor includes a volumetric point cloud imaging device capable of obtaining a point cloud from a volume of space adjacent the robot. The at least one imaging sensor may scan side-to-side to increase a field of view of the imaging sensor.

In some implementations, the controller executes a feature tracker that receives the image data. The feature tracker identifies and tracks at least one feature of the scene across multiple images. The feature tracker may communicate first and second coordinates of the identified at least one feature to the controller, which estimates a third coordinate of the at least one feature. The controller may communicate the estimated third coordinate of the at least one feature back to the feature tracker as feedback.

The controller may communicate a probable feature location of a feature to the feature tracker for identification and tracking. The feature tracker may search the image data for the feature about the probable feature location. In some implementations, the feature tracker scales an image of the scene to instantiate an image pyramid comprising a set of scaled images. The feature tracker identifies at least feature point in the scaled images. The feature tracker may calculate a Harris Corner Score to identify feature points associated with a corner feature of the scene. The feature tracker may select feature points as candidate feature points that have at least one of a local maximum Harris Corner Score or a Harris Corner Score substantially equal to the local maximum Harris Corner Score in a threshold area. In some examples, the feature tracker selects feature points as candidate feature points that have at least one of a local maximum Harris Corner Score or a Harris Corner Score within about 20% of the local maximum Harris Corner Score within a 10 pixel radius of the feature point having the local maximum Harris Corner Score.

In some implementations, the feature tracker selects a feature point of a scaled image as a key point for tracking and produces a descriptor of that key point. The feature tracker may identify the key point in a subsequent image using the descriptor. The descriptor may include feature points within a threshold distance of the key point on the corresponding scaled image of the key point. To create the descriptor, the feature tracker may sample feature points of the descriptor, record a brightness level for each feature point and normalize the brightness levels to have a mean of zero and a variance of one. In some examples, the feature tracker blurs the scaled image and/or rotates the feature points by a threshold angle before sampling the feature points. Moreover, the feature tracker may sample feature points within a threshold area of the scaled image about the key point.

The feature tracker may produce a descriptor for each feature point of a set of feature points, for example, to compare feature descriptors of first and second images to identify a common key point. The feature tracker may searches respective image pyramids of the first and second images to find the common feature point. In some examples, the feature tracker searches within a threshold area of the scaled images of the images pyramids for the common feature point. The feature tracker may determine the threshold area based on at least one of a known previous feature point location or a robot drive trajectory.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Mobile robots can interact or interface with humans to provide a number of services that range from home assistance to commercial assistance and more. In the example of home assistance, a mobile robot can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robot can provide videoconferencing (e.g., in a hospital setting), a point of sale terminal, interactive information/marketing terminal, etc. Mobile robots need to navigate in a robust or reliable manner, for example, to avoid obstacles and reach intended destinations.

Figure 1A:
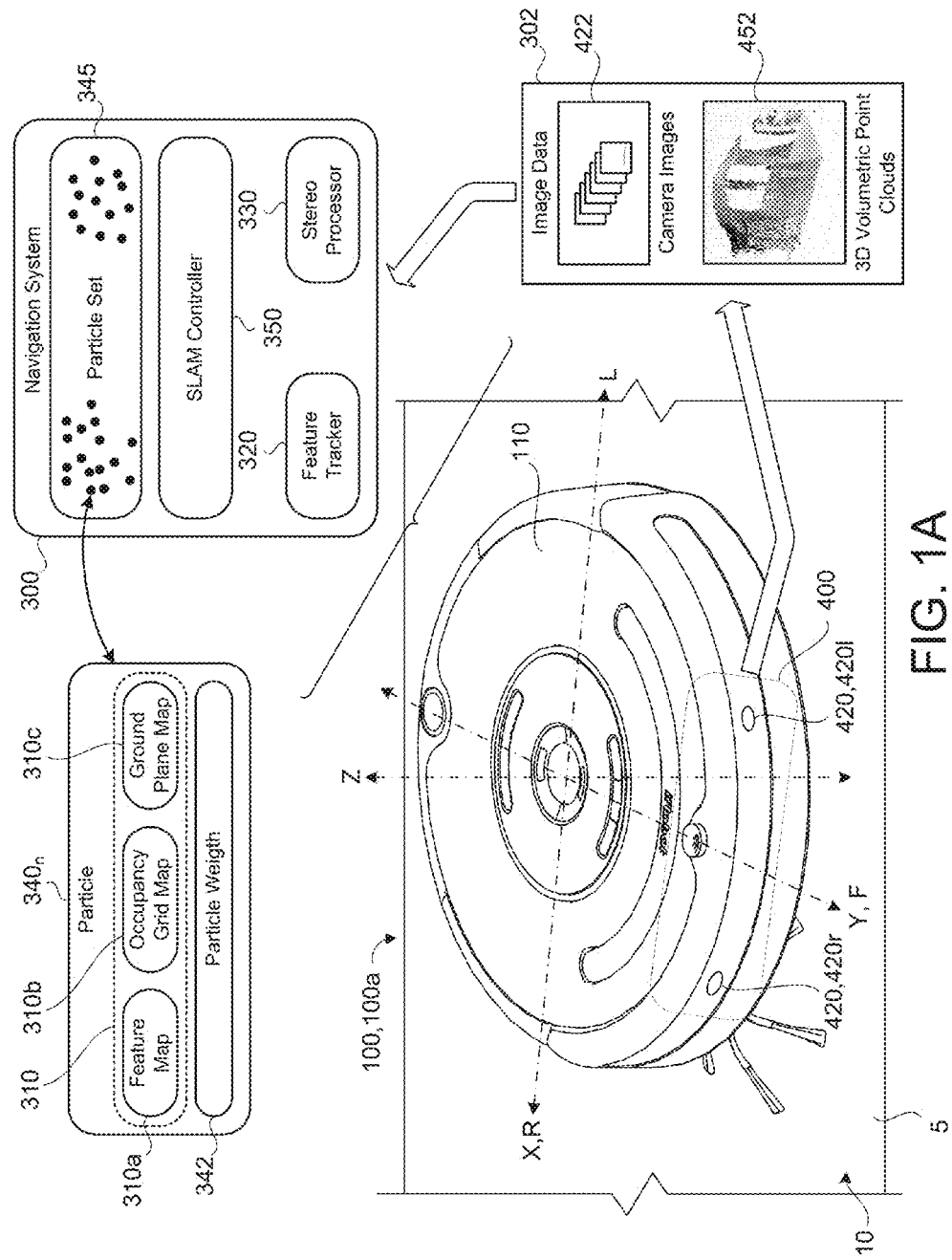
FIG. 1A is a perspective view of an exemplary mobile robot executing a navigation system.
Figure 1B:
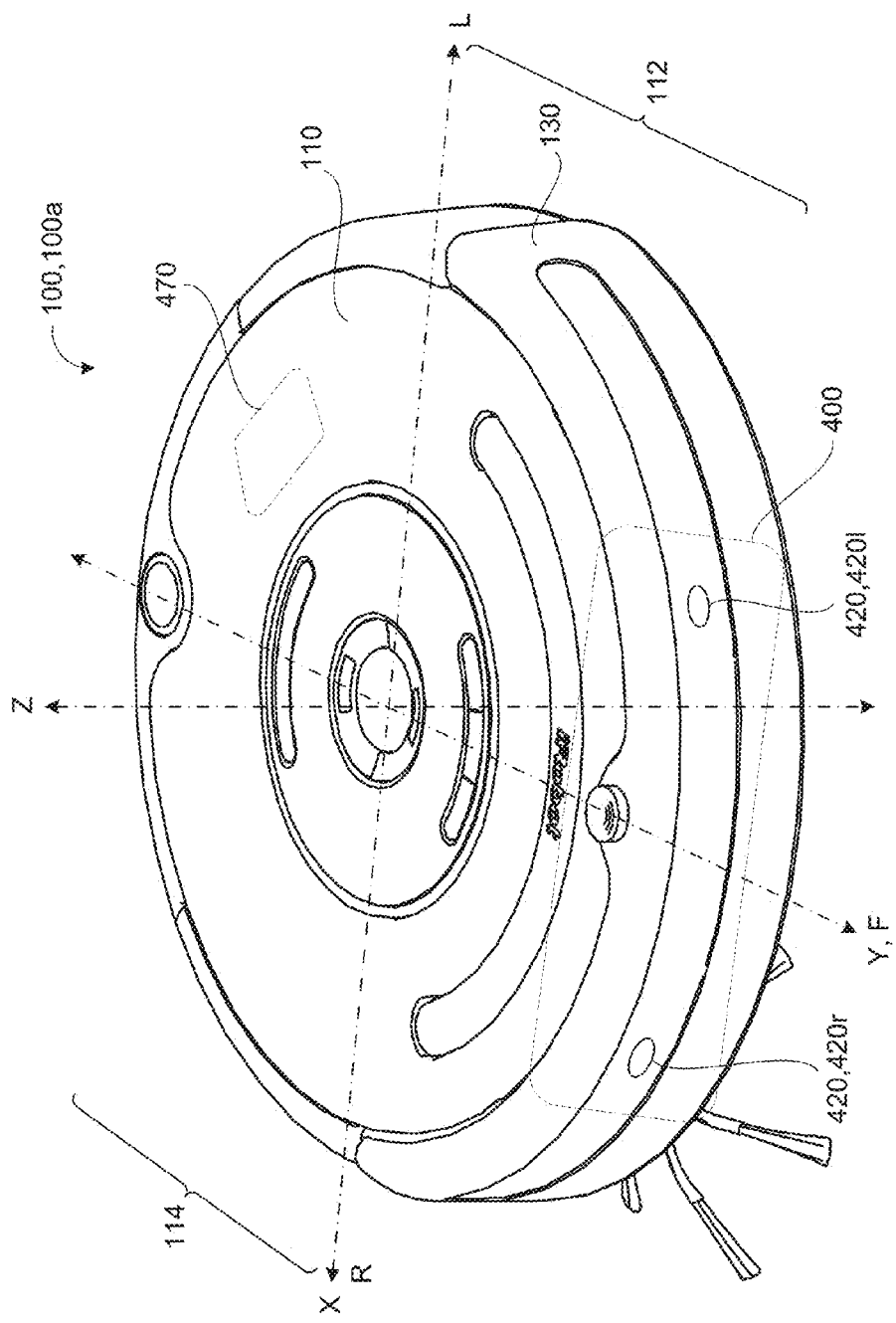
FIG. 1B is a perspective view of an exemplary mobile robot.
Figure 1C:
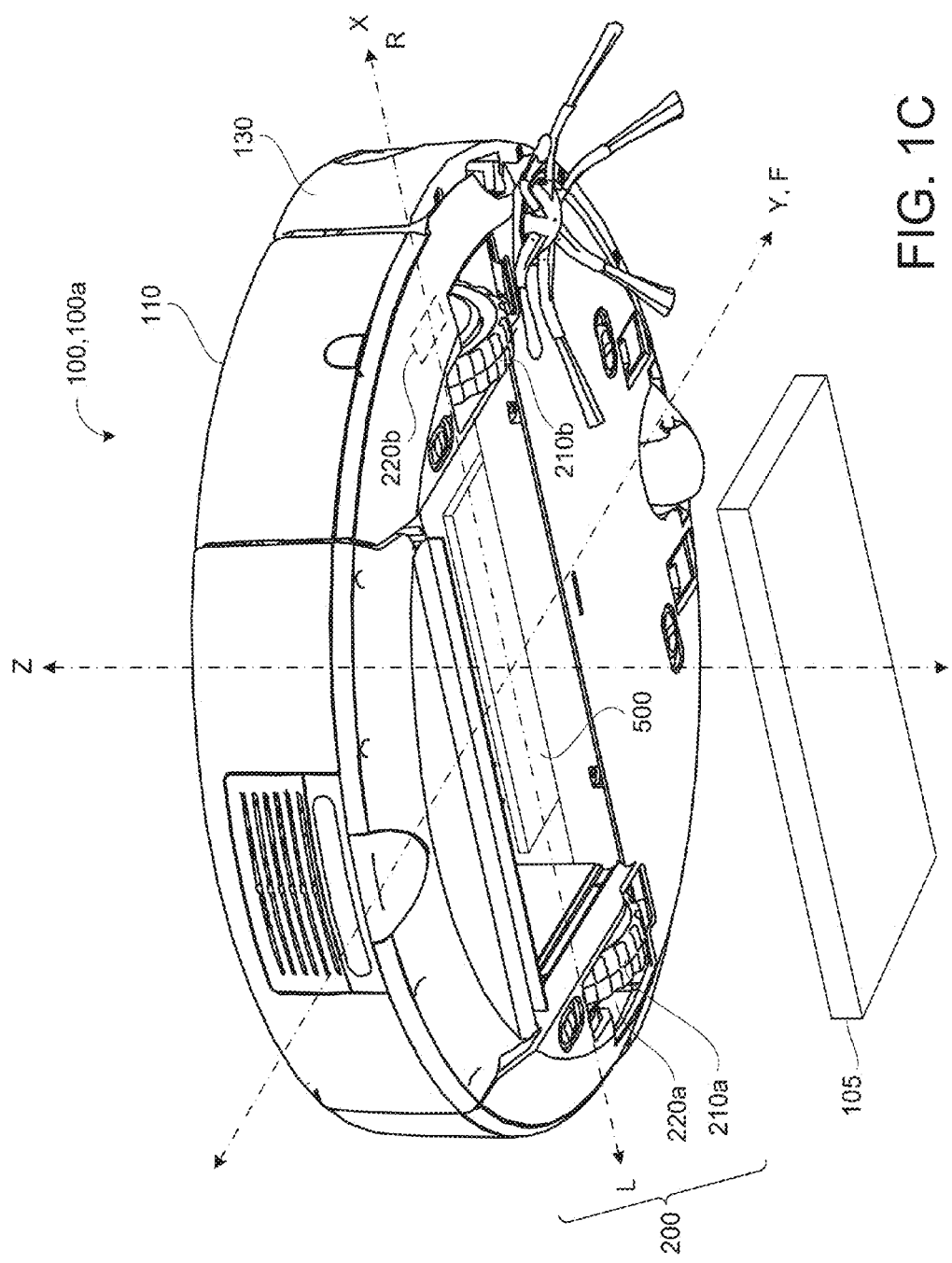
FIG. 1C is an elevated perspective view the mobile robot shown in FIG. 1B.

FIGS. 1A-1C and 2A-2D illustrate exemplary mobile robots 100, 100a, 100b that may operate autonomously using a navigation system 300. FIGS. 1A-1C illustrate an exemplary floor cleaning robot 100a, while FIGS. 2A-2D illustrate an exemplary human interface robot 100b. In some implementations, the mobile robot 100, 100a, 100b includes a robot body 110 (or chassis) that defines a forward drive direction F. The robot 100 also includes a drive system 200 and a sensor system 400, each supported by the robot body 110 and in communication with a controller 500 that coordinates operation and movement of the robot 100. A power source 105 (e.g., battery or batteries) can be carried by the robot body 110 and in electrical communication with, and deliver power to, each of these components, as necessary.

In some implementations, the drive system 200 includes first and second drive wheels 210a, 210b substantially opposed along a transverse axis X defined by the body 110 and driven by corresponding drive motors 220a, 220b, such as for the floor cleaning robot 100a shown in FIGS. 1A-1C.

Figure 2A:
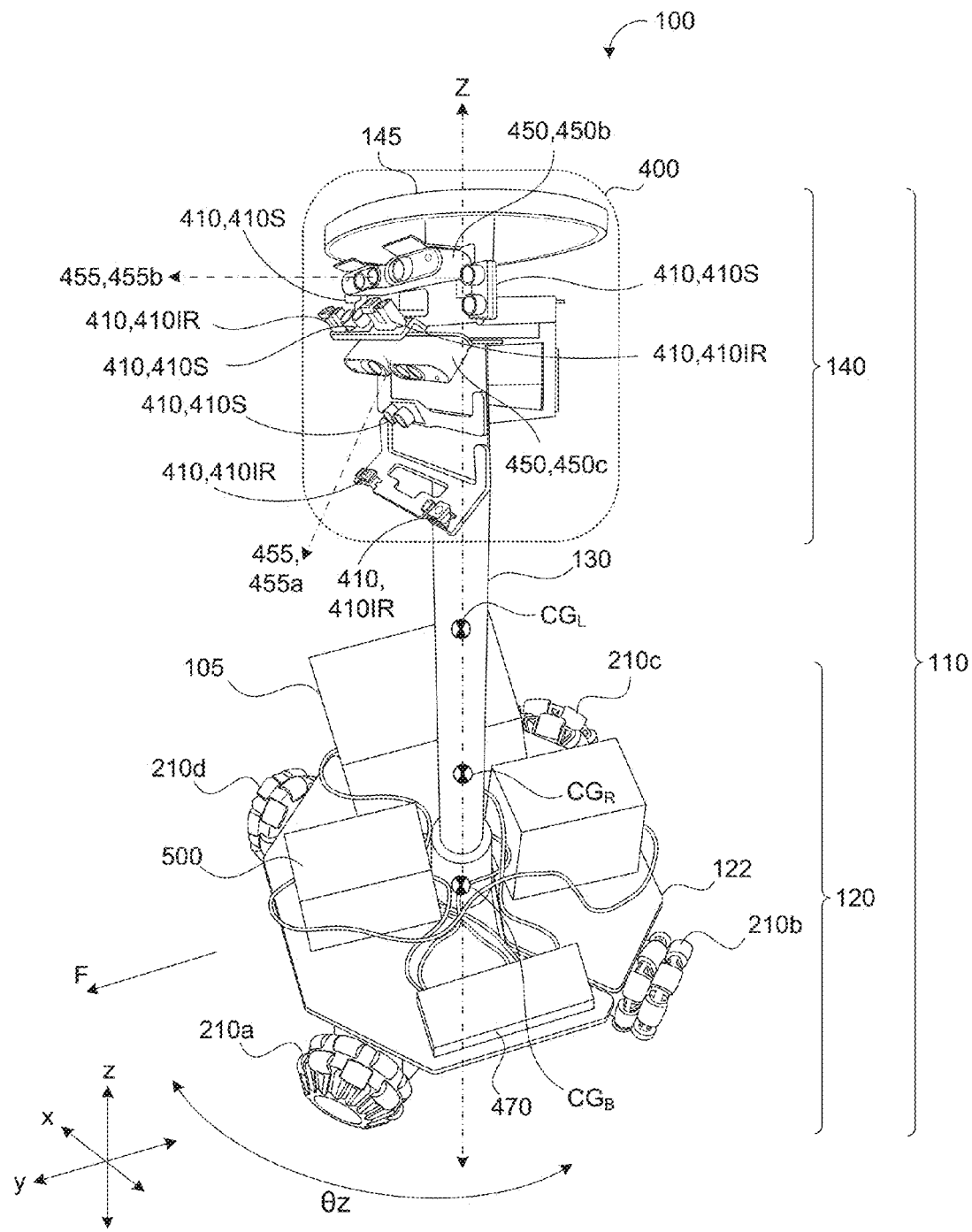
FIG. 2A is a perspective view of an exemplary mobile robot.
Figure 2B:
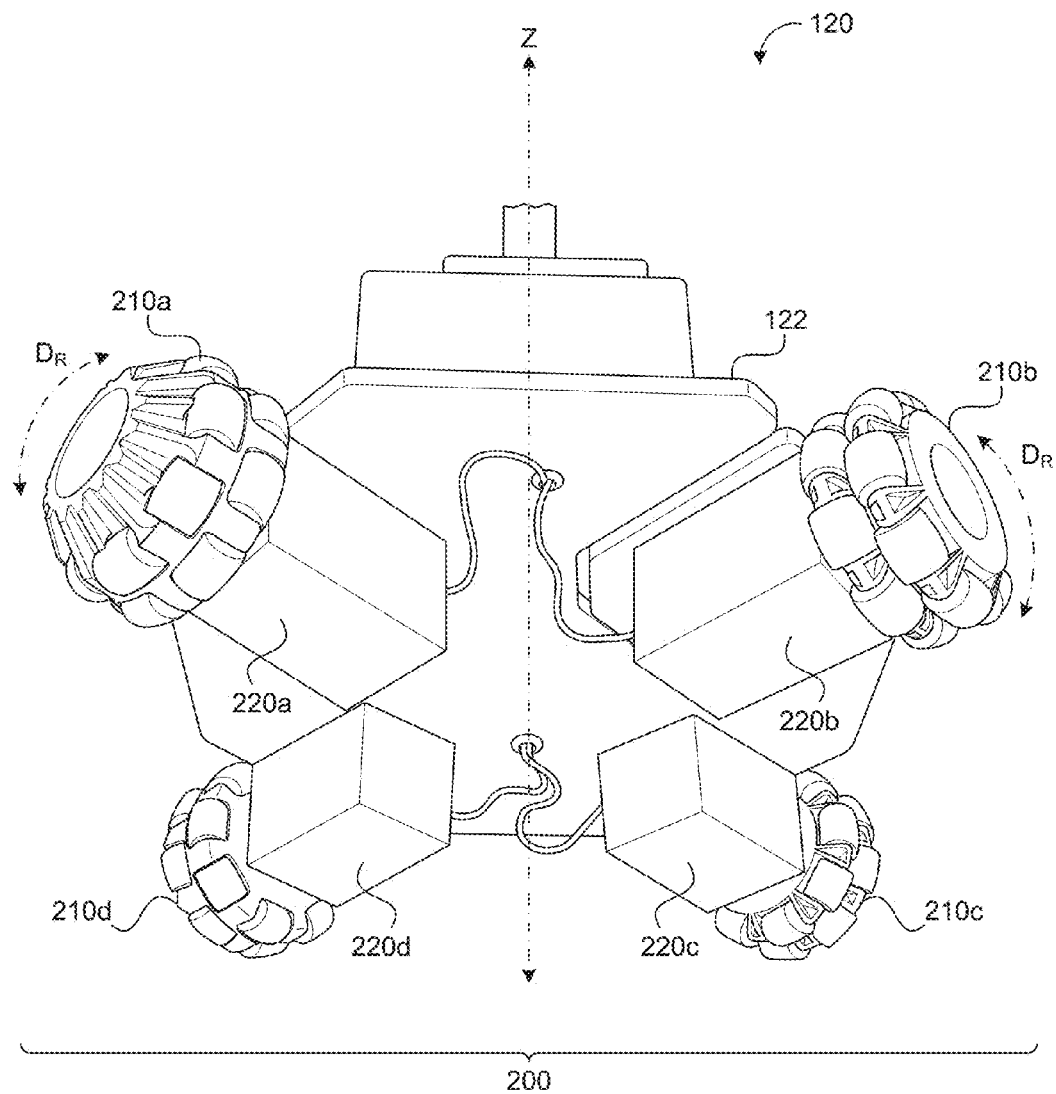
FIG. 2B is an elevated perspective view of an exemplary base for a mobile robot.

Referring to FIGS. 2A and 2B, in some implementations, the drive system 200 may provide omni-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational) as well as the ability to change these proportions in a substantially continuous manner.

In some implementations, the drive system 200 includes first, second, third, and fourth drive wheels 210a, 210b, 210c, 210d equally spaced about a vertical axis Z (e.g., in a square or rectangular configuration from a top view); however, other arrangements are possible as well, such as three drive wheels spaced trilaterally (e.g., 120 degrees apart) about the Z axis. The drive wheels 210a-d may define a transverse arcuate rolling surface (i.e., a curved profile in a direction transverse or perpendicular to the rolling direction $D_R$), which may aid maneuverability of the holonomic drive system 200. Each drive wheel 210a-d is coupled to a respective drive motor 220a-d that can drive the drive wheel 210a-d in forward and/or reverse directions independently of the other drive motors 220a-d. Each drive motor 220a-d can have a respective encoder, which provides wheel rotation feedback to the controller 500. Abuse chassis 122 supports the drive motors 220a-d and the correspondingly coupled drive wheels 210a-d.

For the human interface robot 100b, the robot body 110 may include a base 120 supporting the drive system 200, at least one leg 130 extending upwardly from the base 120, and a torso 140 supported by the at least one leg 130. The torso 140 may have a torso body 142 or cowling for supporting one or more sensors of the sensor system 400. The base 120 may include enough weight (e.g., by supporting the power source 105 (batteries) to maintain a low center of gravity $CG_B$ of the base 120 and a low overall center of gravity $CG_R$ of the robot 100 for maintaining mechanical stability.

To operate autonomously, the robot 100 may use a navigation system 300 to simultaneously localize and map its surroundings, using sensory inputs from the sensor system 400. Simultaneous localization and mapping (SLAM) is a technique the robot 100 may use to build up a map (e.g., an occupancy map) within an unknown environment or scene 10 (without a priori knowledge), or to update an map within a known environment (with a priori knowledge from a given map), while at the same time keeping track of its current location.

Maps 310 can be used to determine a location within an environment 10 and to depict an environment for planning and navigation. The maps 310 support the assessment of actual location by recording information obtained from a form of perception and comparing it to a current set of perceptions. The benefit of a map 130 in aiding the assessment of a location increases as the precision and quality of the current perceptions decrease. Maps 310 generally represent the state at the time that the map 310 is provided or produced. This is not necessarily consistent with the state of the environment at the time the map 310 is used. Other localization techniques include monocular visual SLAM (MonoSLAM) and implementations using an extended Kalman filter (EKF) for Mono-SLAM solutions.

To achieve reliable and robust autonomous movement, the sensor system 400 may include several different types of sensors which can be used in conjunction with one another to create a perception of the robot's environment sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera e.g., visible light, infrared camera and/or stereo camera), sonar, radar, LIDAR (Light Detection And Ranging, which can entail optical remote sensing that measures properties of scattered light to find range and/or other information of a distant target), LADAR (Laser Detection and Ranging), etc.

In some implementations, the sensor system 400 includes an array of proximity sensors 410, one or more cameras 420 (e.g., stereo cameras, visible light camera, infrared camera, etc.), and/or one or more 3-D imaging sensors 450 (e.g., volumetric point cloud imaging device) in communication with the controller 500 and arranged in one or more zones or portions of the robot 100 for detecting any nearby or intruding obstacles. The proximity sensors 410 may be converging infrared (IR) emitter-sensor elements, sonar sensors, and/or ultrasonic sensors that provide a signal to the controller 500 when an object is within a given range of the robot 100. If any of the sensors 410, 420, 450 has a limited field of view, the controller 500 or the sensor system 400 can actuate the sensor 410, 450 in a side-to-side scanning manner to create a relatively wider field of view to perform robust ODOA.

In the examples shown in FIGS. 1A-1C, the robot 100, 100a includes right and left cameras 420r, 420l (e.g., stereo cameras) disposed on a forward portion 112 of the robot body 110, such as on a front bumper 130. Additionally or alternatively, one or more cameras 420 can be disposed on a reward portion 114 of the robot body 110. The cameras 420r, 420l may be arranged to have a field of view along a forward drive direction F of the robot 100. In some implementations, one of the cameras 420,420r, 420l is a 2D image camera, while the other is a 3D image camera. The camera(s) 420 capture images 422, which the navigation system 300 receives for localizing the robot 100 and mapping its surroundings.

In the examples shown in FIGS. 2A-2D, the robot 100, 100b includes 3-D image sensors 450 may be capable of producing the following types of data: (i) a depth map or point cloud 452, (ii) a reflectivity based intensity image, and/or (iii) a regular intensity image. The 3-D image sensors 450 may obtain such data by image pattern matching, measuring the flight time and/or phase delay shift for light emitted from a source and reflected off of a target.

In some implementations, reasoning or control software, executable on a processor (e.g., of the robot controller 500), uses a combination of algorithms executed using various data types generated by the sensor system 400. The reasoning software processes the data collected from the sensor system 400 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve simultaneous localization and mapping (SLAM).

The reliability of executing robot collision free moves may be based on: (i) a confidence level built by high level reasoning over time and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor 450. The aggregate data may improve the confidence level as compared to a system using only one of the kinds of data.

The 3-D image sensors 450 may obtain images containing depth and brightness data from a scene about the robot 100 (e.g., a sensor view portion of a room or work area) that contains one or more objects. The controller 500 may be configured to determine occupancy data for the object based on the captured reflected light from the scene. Moreover, the controller 500, in some examples, issues a drive command to the drive system 200 based at least in part on the occupancy data to circumnavigate obstacles (i.e., the object in the scene). The 3-D image sensors 450 may repeatedly capture scene depth images for real-time decision making by the controller 500 to navigate the robot 100 about the scene without colliding into any objects in the scene. For example, the speed or frequency in which the depth image data is obtained by the 3-D image sensors 450 may be controlled by a shutter speed of the 3-D image sensors 450. In addition, the controller 500 may receive an event trigger (e.g., from another sensor component of the sensor system 400, such as proximity sensor 410, notifying the controller 500 of a nearby object or hazard. The controller 500, in response to the event trigger, can cause the 3-D image sensors 450 to increase a frequency at which depth images are captured and occupancy information is obtained.

Figure 2C:
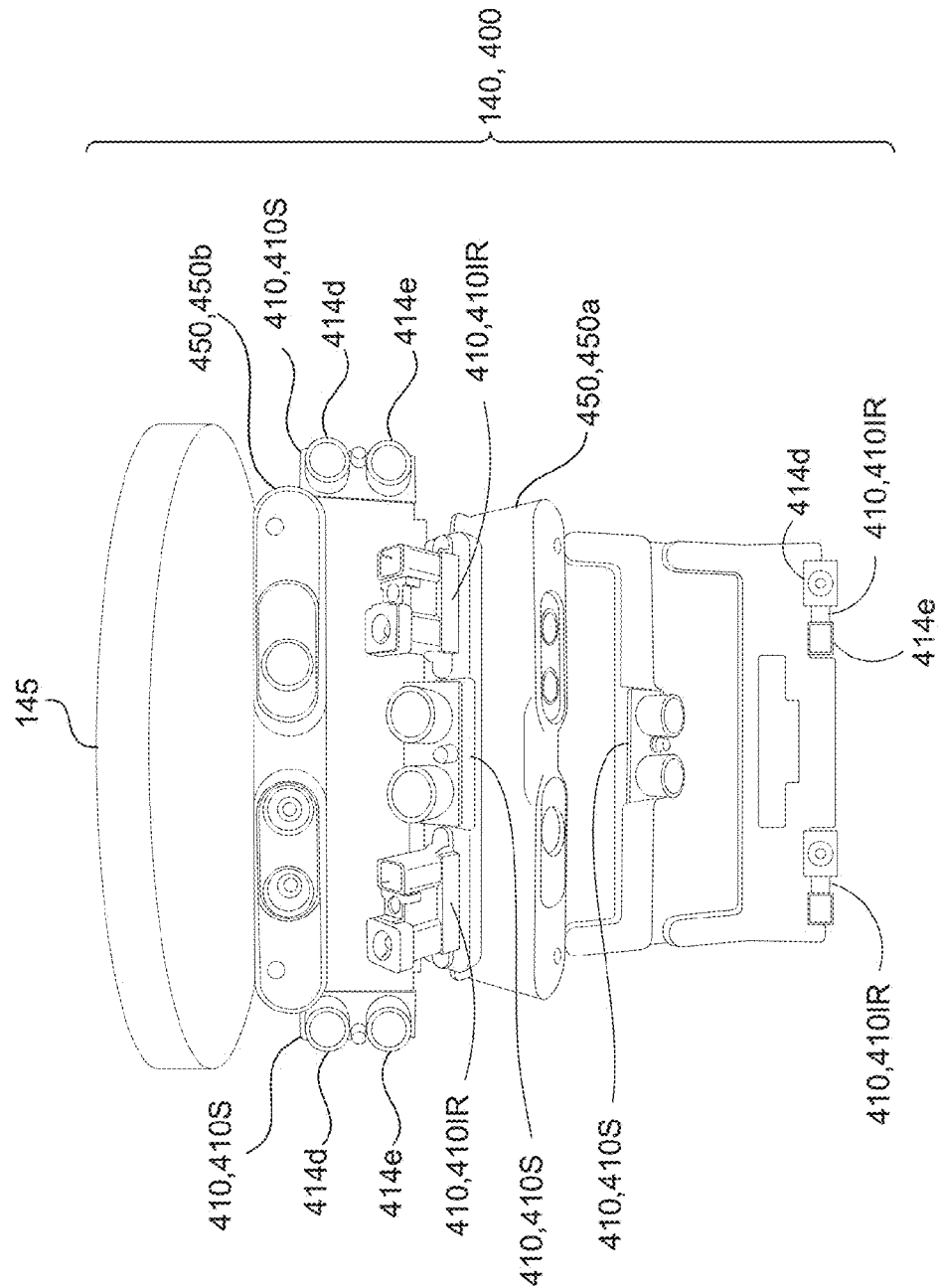
FIG. 2C is a front view of a sensor arrangement of the robot shown in FIG. 2A.

Referring to FIG. 2C, in some implementations, the robot 100 includes a first and second imaging sensors 450a, 450b (e.g., 3D depth imaging sensors) disposed on the torso 140. Both imaging sensors 450a, 450b are arranged to have a field of view 452 along the forward drive direction F. The first imaging sensor 450a is arranged to aim its imaging axis 455 substantially downward and away from the robot 100 (e.g., to view an area on the ground and/or about a lower portion of the robot) to detect objects before contact with the base 120 or leg 130. By angling the first imaging sensor 450a downward, the robot 100 receives dense sensor coverage in an area immediately forward or adjacent to the robot 100, which is relevant for short-term travel of the robot 100 in the forward direction. The second imaging sensor 450b is arranged with its imaging axis 455 pointing substantially parallel with the ground along the forward drive direction F (e.g., to detect objects approaching a mid and/or upper portion of the robot 100). In other examples, the second imaging sensor 450b is arranged with its imaging axis 455 pointing above the ground or even upward away from the ground.

In some implementations, the imaging sensor 450 has an imaging dead zone, which is a volume of space about the imaging sensor 450 (e.g., immediately proximate the imaging sensor 450) in which objects are not detected. The dead zone is positioned between the imaging sensor 450 and a detection field 452 of the imaging sensor 450. The torso 140 may support an array of proximity sensors 410 to detect objects in the dead zone of the imaging sensor(s) 450 and/or to provide redundant sensing for the imaging sensor(s) 450, thus allowing the robot 100 to robustly determine a local perceptual space of its environment.

One or more of the proximity sensors 410 of the sensor system 400 may have an emitter 414e and a detector 414d. For an infrared proximity sensor 410, for example, the emitter 414e is an infrared light emitter and the detector 414d is a photodetector arranged such that an emission field of the emitter 414e converges or intersects with a detection field of the detector 414d. For a sonar proximity sensor 410, for example, the emitter 414e emits acoustics and the detector 414d detects acoustic reflections.

The torso 140 may support an array of sonar proximity sensors 410S and/or an array of infrared (IR) proximity sensors 410IR arranged to detect objects or obstacles about the robot 100 and/or in the imaging dead zone. The sonar proximity sensors 410S and/or an array of infrared (IR) proximity sensors 410IR may be arranged to aim upward and away from the robot 100 along a driving direction, downward and away from the robot 100 along a driving direction, or away way from the robot 100 substantially parallel to the floor surface.

Figure 2D:
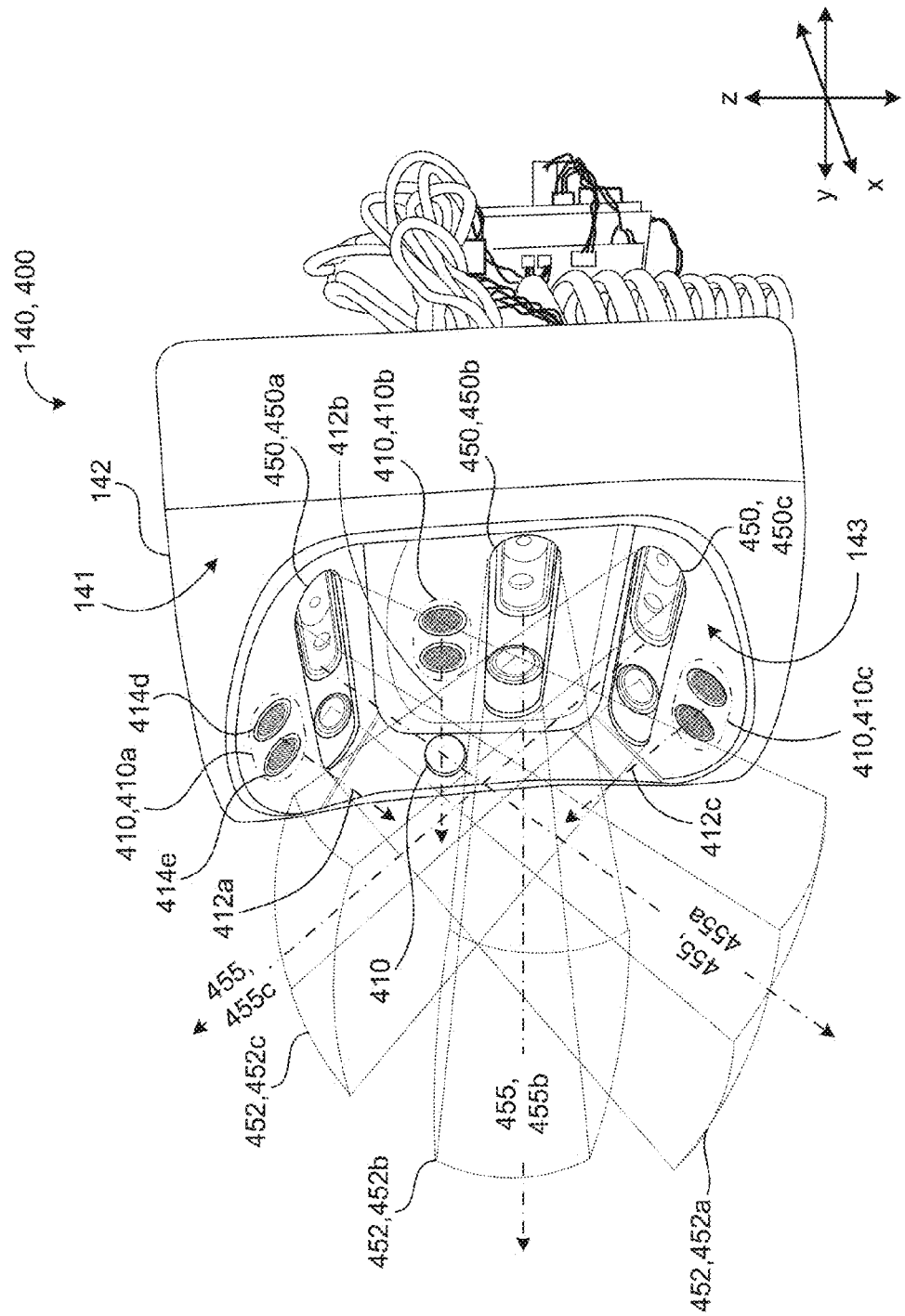
FIG. 2D is a side perspective view of an exemplary sensor arrangement for a mobile robot.

Referring to FIG. 2D, in some implementations, the torso 140 includes first, second, and third imaging sensors 450, 450a, 450b, 450c. Each imaging sensor 450 is arranged to have a field of view 452 centered about an imaging axis 455 directed along the forward drive direction F. The first imaging sensor 450a is arranged to aim its imaging axis 455a downward and away from the torso 140. By angling the first imaging sensor 450a downward, the robot 100 receives dense sensor coverage in an area immediately forward or adjacent to the robot 100, which is relevant for short-term travel of the robot 100 in the forward direction. The second imaging sensor 450b is arranged with its imaging axis 455b pointing substantially parallel with the ground along the forward drive direction (e.g., to detect objects approaching a mid and/or upper portion of the robot 100). The third imaging sensor 450c is arranged to have its imaging axis 455c arranged to aim upward and away from the torso 140.

The torso body 142 may define a three dimensional projective surface 141 of any shape or geometry, such as a polyhedron, circular or an elliptical shape. In some implementations, the torso body 142 defines a circular envelope rotatable mounted on the leg 130 such that a longitudinal central axis Z of the torso body 142 is coaxial with the central longitudinal axis Z of the leg 130. For example, the torso body 142 may define a cylinder, which enables unobstructed rotation of the torso 140 for complete and uninterrupted sensor scanning.

During fast travel, the robot 100 may use the first imaging sensor 450a, which is aimed downward slightly to increase a total or combined field of view of both the first and second imaging sensors 450a, 450b, and to give sufficient time for the robot 100 to avoid an obstacle (since higher speeds generally mean less time to react to obstacles). At slower speeds, the robot 100 may use the third imaging sensor 450c, which is aimed upward above the ground G, to track a person that the robot 100 is meant to follow. The third imaging sensor 450c can be arranged to sense objects as they approach a payload of the torso 140.

In some implementations, torso body 142 supports one or more proximity sensors 410 (e.g., infrared sensors, sonar sensors and/or stereo sensors) for detecting objects and/or obstacles about the robot 100. In the example shown in FIG. 2D, the torso body 140 includes first, second, and third proximity sensors 410a, 410b, 410c disposed adjacent to the corresponding first, second, and third imaging sensor 450a, 450b, 450c (e.g., within a torso body recess 143) and have corresponding sensing axes 412a, 412b, 412c arranged substantially parallel to the corresponding imaging axes 455a, 455b, 455c of the first, second, and third imaging sensors 450a, 450b, 450c. Having the first, second, and third proximity sensors 410a, 410b, 410c arranged to sense along substantially the same directions as the corresponding first, second, and third imaging sensors 450a, 450b, 450c provides redundant sensing and/or alternative sensing for recognizing portions or objects of the local environment and for developing a robust local perception of the robot's environment. Moreover, the proximity sensors 410 may detect objects within an imaging dead zone of imaging sensors 450.

Referring again to FIG. 2B, the sensor system 400 may include an inertial measurement unit (IMU) 470 in communication with the controller 500 to measure and monitor a moment of inertia of the robot 100 with respect to the overall center of gravity $CG_R$ of the robot 100. The controller 500 may monitor any deviation in feedback from the IMU 470 from a threshold signal corresponding to normal unencumbered operation.

Referring to FIGS. 1A, 2A, 3A and 3B, in some implementations, a navigation system 300 executable by the robot controller 500 concurrently builds multiple maps 310 (e.g., feature based maps 310a, occupancy maps 310b and/or ground plane maps 310c) using image data 302 for simultaneously localizing the robot 100 and mapping its environment. The navigation system 300 includes a feature tracker 320 and a stereo processor 330, both of which receive image data 302 from imaging sensors, such as the stereo cameras 420 and/or the 3D imaging sensor(s) 450 of the sensor system 400. The image data 302 may include two-dimensional (2D) images from a camera 420, three-dimensional (3D) images from right and left stereo cameras 420r, 420l, and/or 3D volumetric point clouds from a 3D imaging sensor 450. The feature tracker 320 and the stereo processor 330 both communicate with a simultaneous localization and mapping (SLAM) controller 350.

The SLAM controller 350 executes a MultiSLAM routine that allows a mobile robot 100 using stereo imagery (e.g., from stereo cameras 420r, 420l or a camera 420 and a 3D imaging sensor 450 generating point clouds) to simultaneously build at least two of a feature based map 310a (e.g., monoSLAM), an occupancy grid map 310b, and a ground plane map 310c at the same time. This increases the robustness and reliability of mapping by processing vision data (e.g., from the same sensor(s)) using multiple techniques. When one technique temporarily fails, the robot 100 can still obtain reliable localization and a map of its environment.

In some implementations, the SLAM controller 350 uses a Rao-Blackwellized Particle Filter 352 (e.g., with inverse-depth parameterization) having a set 345 of particles $340_{1-n}$ that represent hypotheses of a pose or position 342 of the robot 100 in its environment, e.g., at a current time. The particle 340 includes a trajectory 344 of the robot 100, which is a history of the robot positions 342 over time. Each particle $340_n$ builds its own associated map data relative to the robot trajectory 344. Each particle $340_n$ may include one or more maps, such as a feature map 310a (e.g., list of features), an occupancy grid map 310b, and/or a ground plane map 310c. The SLAM controller 350 may use two separate perceptual processes on each map update to build and score the maps 310. Typically, monoSLAM has a hard time with nearby feature tracking due to robot movement and stereo or point cloud information density typically falls off with range away from the robot 100. The SLAM controller 350 allows monoSLAM features to stabilize the localization using "long range" observations and fills in local detailed data at high resolution based on stereo or point cloud data.

Each particle $340_n$ may represent a joint map hypothesis including a feature map 310a, an occupancy grid map 310b, and/or a ground plane map 310c. Moreover, the maps 310a-c may be relative to the robot trajectory 344 of the respective particle 340 and, therefore, relative to the robot positions 342 of that particle 340 over time. The SLAM controller 350 may score each particle $340_n$, for example, beam scoring for variances and Gaussian scoring for features, to generate separate scores for each map element. The SLAM controller 350 may combine these scores by a weighting function to generate a final mapping score for each particle $340_n$. This allows the separate map representations to contribute to the fitness of the particle $340_n$ in the particle filter.

This approach improves the robustness of particle filter based map building while at the same time generating an occupancy grid representation much more suitable for display and processing for human interaction with the robot. While a feature map 310a looks like a "constellation of stars" floating in space, the variance based occupancy map 310b can be interpreted much more like a "floor plan" of the mapped space. Moreover, the occupancy map 310b created by this technique allows a more "human friendly" CAD-Like model of the robot environment or scene while incorporating the capabilities of monocular visual SLAM at the same time.

In some implementations, the feature tracker 320 determines feature bearings, which are scored using an inverse depth feature model 322. A feature 424 may be a specific point or line in an image 422 that a tracking algorithm can lock onto and follow through multiple images 422 (see e.g., FIGS. 4A and 4C). The feature tracker 310 may select features 424 that are bright/dark spots, edges or corners depending on the particular tracking algorithm. In some examples, the feature tracker 320 tracks vertical line features and point features. Each feature 424 represents a specific point on the surface of a real object, such as a floor 5, wall 7, or some object 12 in a scene 10 about the robot 100. The feature tracker 310 may provide a series of two-dimensional coordinates that represent the position of a feature 424 across a series of images 422.

In some implementations, the navigation system 300 determines the motion of the imaging sensor(s) 420, 450 in the environment 10 by solving the inverse-projection of the 2D paths for the position of the imaging sensor(s) 420, 450. After determining a position of the imaging sensor(s) 420, 450 for every captured image 422 (or a set thereof), the navigation system 300 can estimate the position of each feature 424 in real space by inverse projection using an inverse depth feature model 322. A resulting set of points is referred to as a point cloud 452. A feature based occupancy map 310a (also referred to as a feature map) tracks the features 424, represented using the inverse depth feature model 322. This allows un-delayed initialization of features 424 on-the fly which allows the feature map 310a to include features 424 whose precise location is not yet known, but then locate those features 424 in 3D space over successive observations. The feature map 310a allows the navigation system 300 to stabilize robot orientation estimates using relatively far away features 424.

The stereo processor 330 processes image data 302 received from the imaging sensor(s) 420, 450 (e.g., the first and second stereo cameras 420r, 420l) to provide point clouds 452. In some examples, the stereo processor 330 processes dense visual stereo using a variance occupancy grid model 332 to provide a variance occupancy grid map 310b for each particle $340_n$. The feature tracker 320 may use image data 302 from one of the stereo cameras 420r, 420l (e.g., monocular vision) for ground plane segmentation and feature tracking. In some examples, a ground plane occupancy grid model 334 receives feature bearings from the feature tracker 320 and point clouds 352 from the stereo processor 330. Using the ground plane occupancy grid model 334 and the image data 302, the SLAM controller 350 may detect a plane corresponding to the floor 5 and back project into one or more camera images 422 a projected ground plane 426.

Referring also to FIGS. 4A-4D, in some implementations, an occupancy grid map 310b may be a 2D-XY grid 312 having cells 314 along an X direction and a Y direction. Each cell 314 of the variance occupancy grid map 310b contains the accumulated height variance of the 3D point cloud data 452 falling within that cell 314 as well as the accumulated mean, minimum, and maximum values of the cloud points 452 in the area of the variance occupancy grid map 310*b*. The "variance" is used as the occupancy or intensity values stored in the variance occupancy grid map 310*b*. The variance occupancy grid map 310*b* allows the navigation system 300 to stabilize robot position using locally dense 3D environment structure.

In some examples, each cell 314 may have a threshold size, such as 5 cm by 5 cm. The occupancy grid model 332 accumulates 3D point cloud data 452 having x, y, and z coordinates from the imaging sensor(s) 420, 450 by receiving cloud points in cells 314 occupying the corresponding x, y values of the cloud points 454. For example, a first cell occupying x=0-5 cm and y=0-5 cm receives a cloud point 454 having an x value of 3 cm and a y value of 2 cm. Each cell 314 has a height variance equal to a difference between a maximum z value and a minimum z value of all the cloud points occupying that cell 314. The variance occupancy grid model 332 scores each particle 340$_n$ by comparing the height variance of the particle's occupancy grid map 310*b* against the sensor data points of a current sensing scan 405. A cell 414*f* having no height data may be classified as unoccupied or free, whereas a cell 414*o* having height data may be classified as occupied.

Odometry is the use of data from the movement of actuators to estimate change in position over time (distance traveled). In some examples, an encoder is disposed on the drive system 200 for measuring wheel revolutions, therefore a distance traveled by the robot 100. The controller 500 may use odometry in assessing a confidence level for an object location. In some implementations, the sensor system 400 includes an odometer and/or an angular rate sensor (e.g., gyroscope or the IMU 470) for sensing a distance traveled by the robot 100. A gyroscope is a device for measuring or maintaining orientation, based on the principles of conservation of angular momentum. The controller 500 may use odometry and/or gyro signals received from the odometer and/or angular rate sensor, respectively, to determine a location of the robot 100 in a working area 5. In some examples, the controller 500 uses dead reckoning. Dead reckoning is the process of estimating a current position based upon a previously determined position, and advancing that position based upon known or estimated speeds over elapsed time, and course. By knowing a robot location in the working area 5 (e.g., via odometry, gyroscope, etc.) as well as a sensed location of one or more objects 12 in the working area 5 (via the sensor system 400), the controller 500 can assess a relatively higher confidence level of a location or movement of an object 12 on an occupancy map 310 and in the working area 5 (versus without the use of odometry or a gyroscope).

Odometry based on wheel motion can be electrically noisy. The controller 500 may receive image data from the imaging sensor 450 of the environment or scene 10 about the robot 100 for computing robot motion, independently of wheel based odometry of the drive system 200, through visual odometry. Visual odometry may entail using optical flow to determine the motion of the imaging sensor (s) 420, 450. The controller 500 can use the calculated motion based on imaging data of the imaging sensor(s) 420, 450 for correcting any errors in the wheel based odometry, thus allowing for improved mapping and motion control. Visual odometry may have limitations with low-texture or low-tight scenes 10, if the imaging sensor(s) 420, 450 cannot track features within the captured image(s).

Other details and features on odometry and imaging systems, which may combinable with those described herein, can be found in U.S. patent application Ser. No. 13/032,312, filed on Feb. 22, 2011, U.S. patent application Ser. No. 13/032,228, filed on Feb. 22, 2011, U.S. patent application Ser. No. 13/032,370, filed on Feb. 22, 2011, U.S. Pat. No. 7,158,317 (describing a "depth-of field" imaging system), and U.S. Pat. No. 7,115,849 (describing wavefront coding interference contrast imaging systems), the contents of which are hereby incorporated by reference in their entireties.

The robot motion model 360 models movement and corresponding measurement error of the robot 100. Using odometry and/or an inertial measurement unit (IMU) 470, the robot motion model 360 measures motion (e.g., travel distance and/or travel path) of the robot 100. Due to drive wheel slip, encoder tolerances, etc., the measured odometry may include an error or tolerance. For example, if the robot 100 rotates 90° and translates one meter, the measured odometry may be off by +/−10° of rotation and +/−5 cm of translation. Moreover, the IMU 470 may have a different error, depending on it method of measurement (e.g., gyro). The robot motion model 360 may be a Gaussian error model centered on a travel vector derived from imaging sensor data relative to a travel vector derived from odometry and/or the IMU 470, where one standard deviation of the Gaussian curve equals noise. The particle filter 352 has an estimated robot motion between filter iterations. The particle filter 352 may apply the robot motion model 360 to a measured robot motion (e.g., using odometry and/or the IMU) and sample the particles 340$_n$ front the robot motion model 360.

Figure 4A:
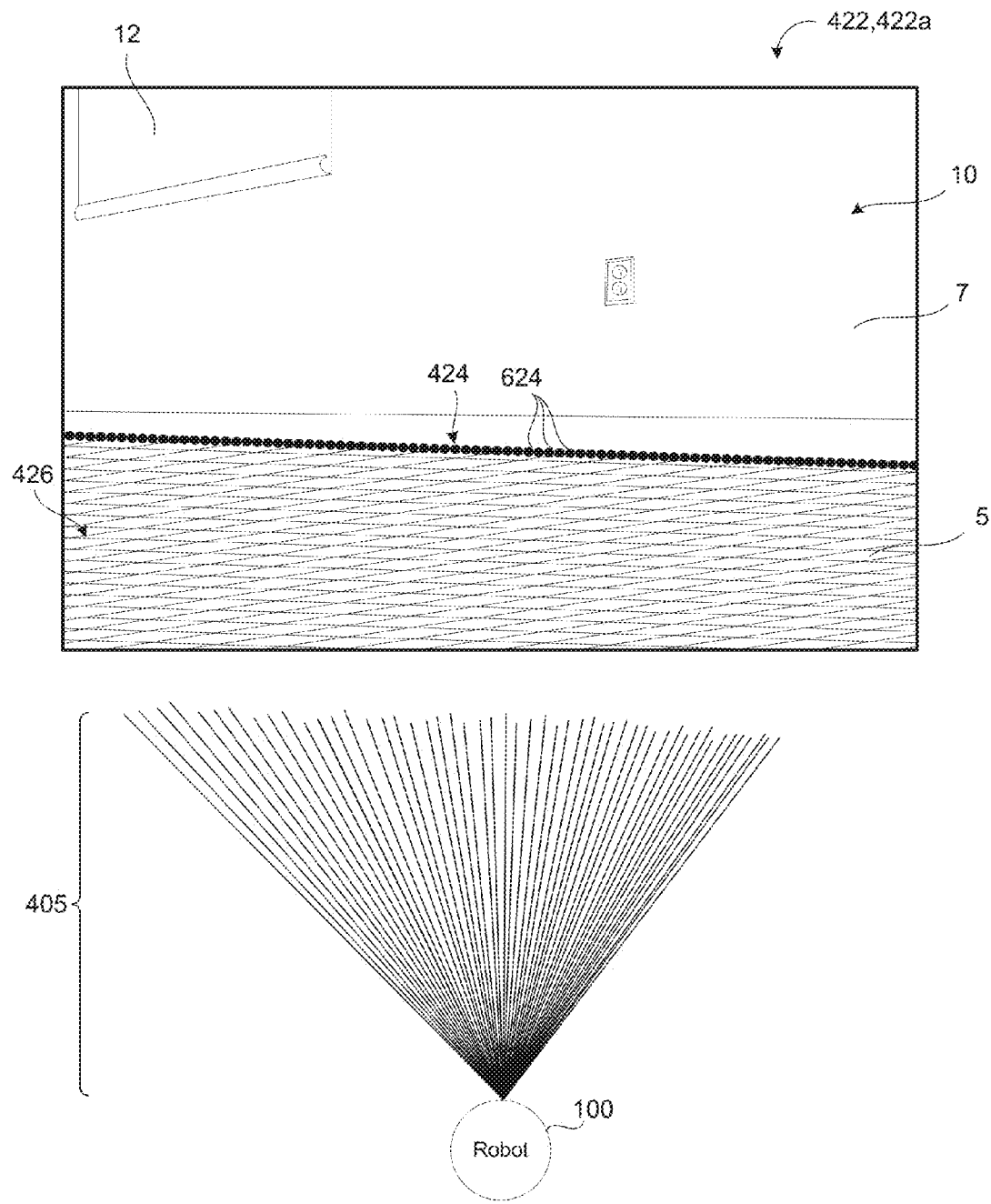
FIG. 4A is schematic view of an exemplary image with respect to an image scan by a mobile robot.
Figure 4B:
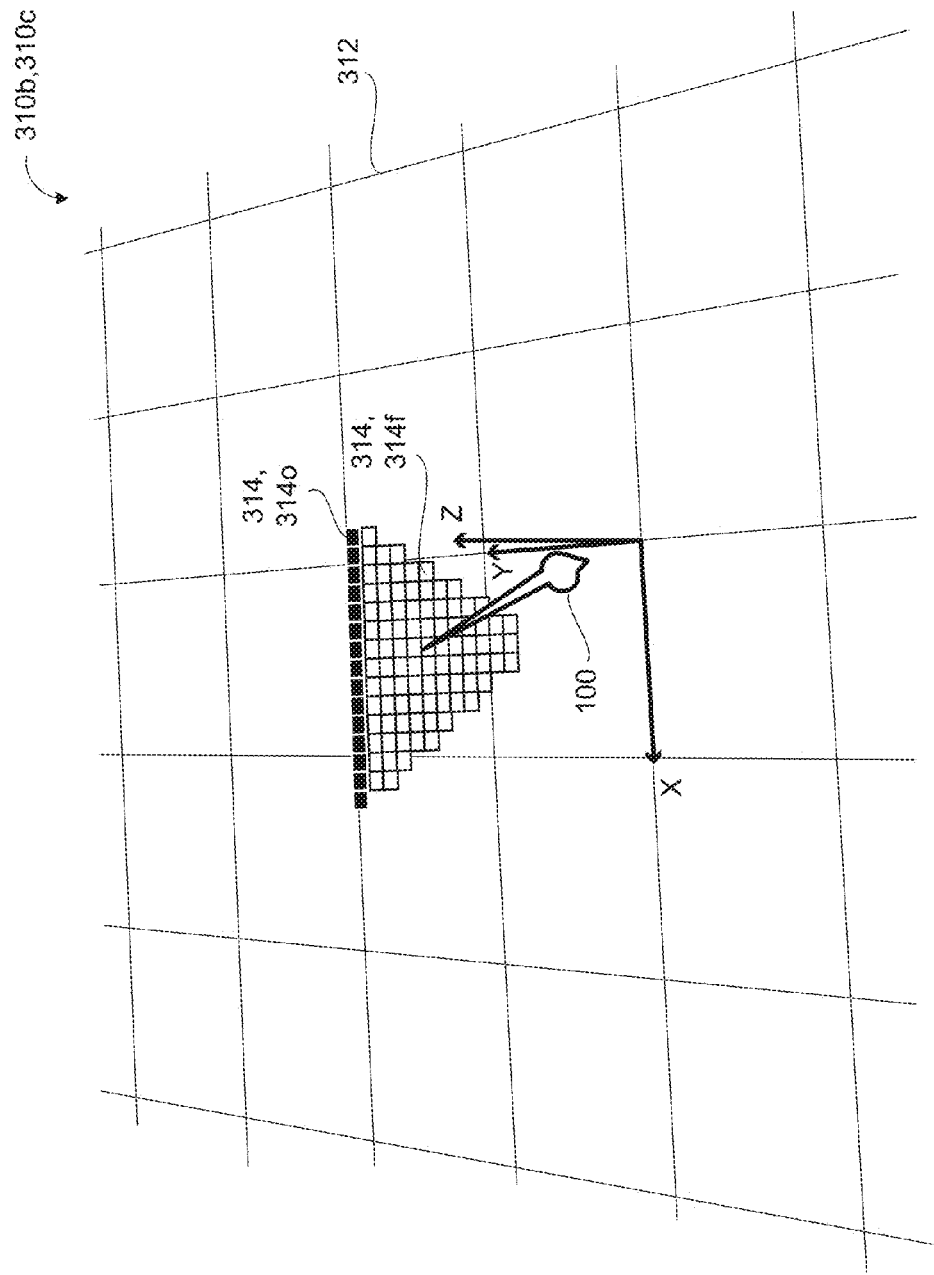
FIG. 4B is schematic view of an exemplary occupancy grid map.
Figure 4C:
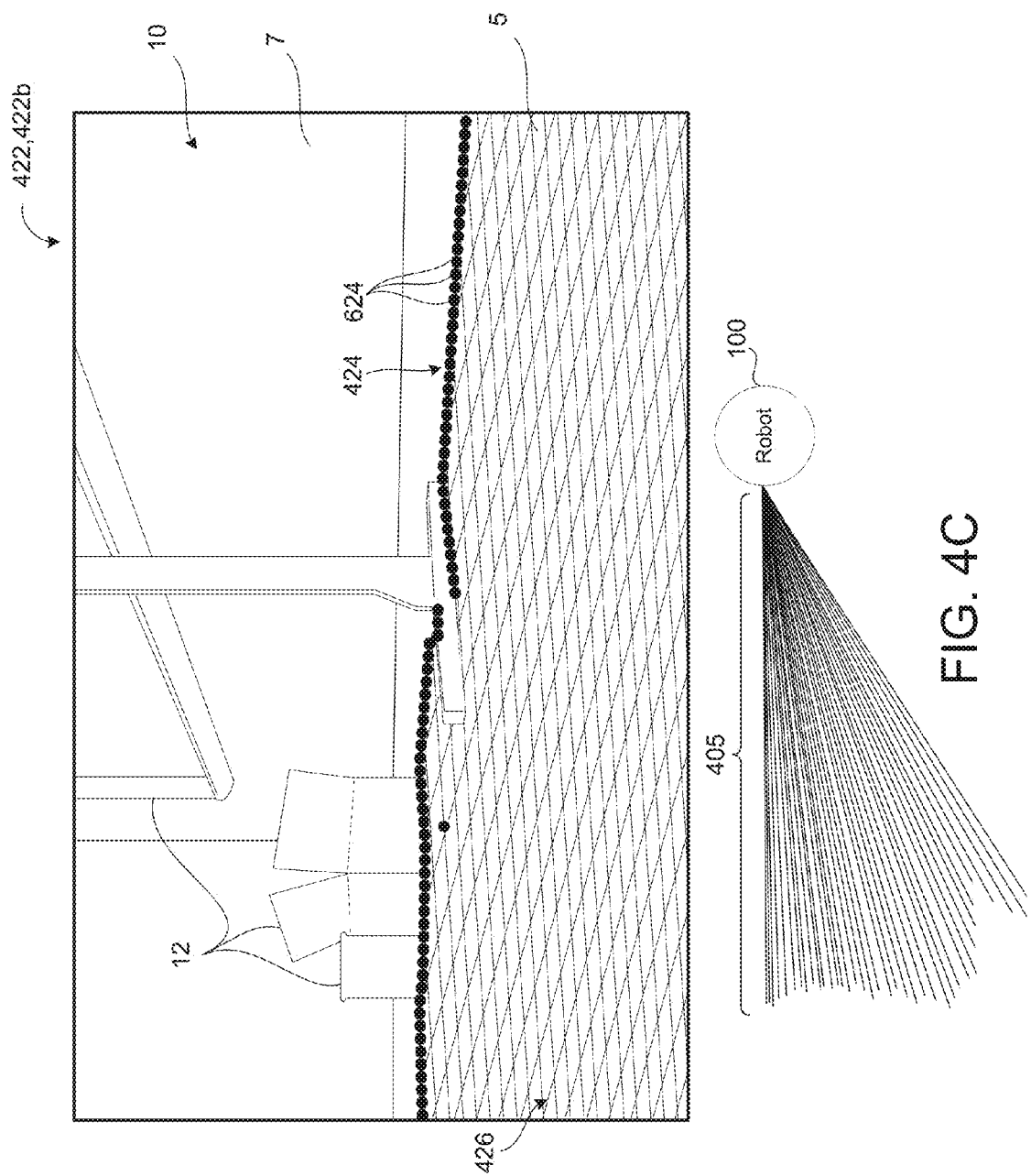
FIG. 4C is schematic view of an exemplary image with respect to an image scan by a mobile robot.
Figure 4D:
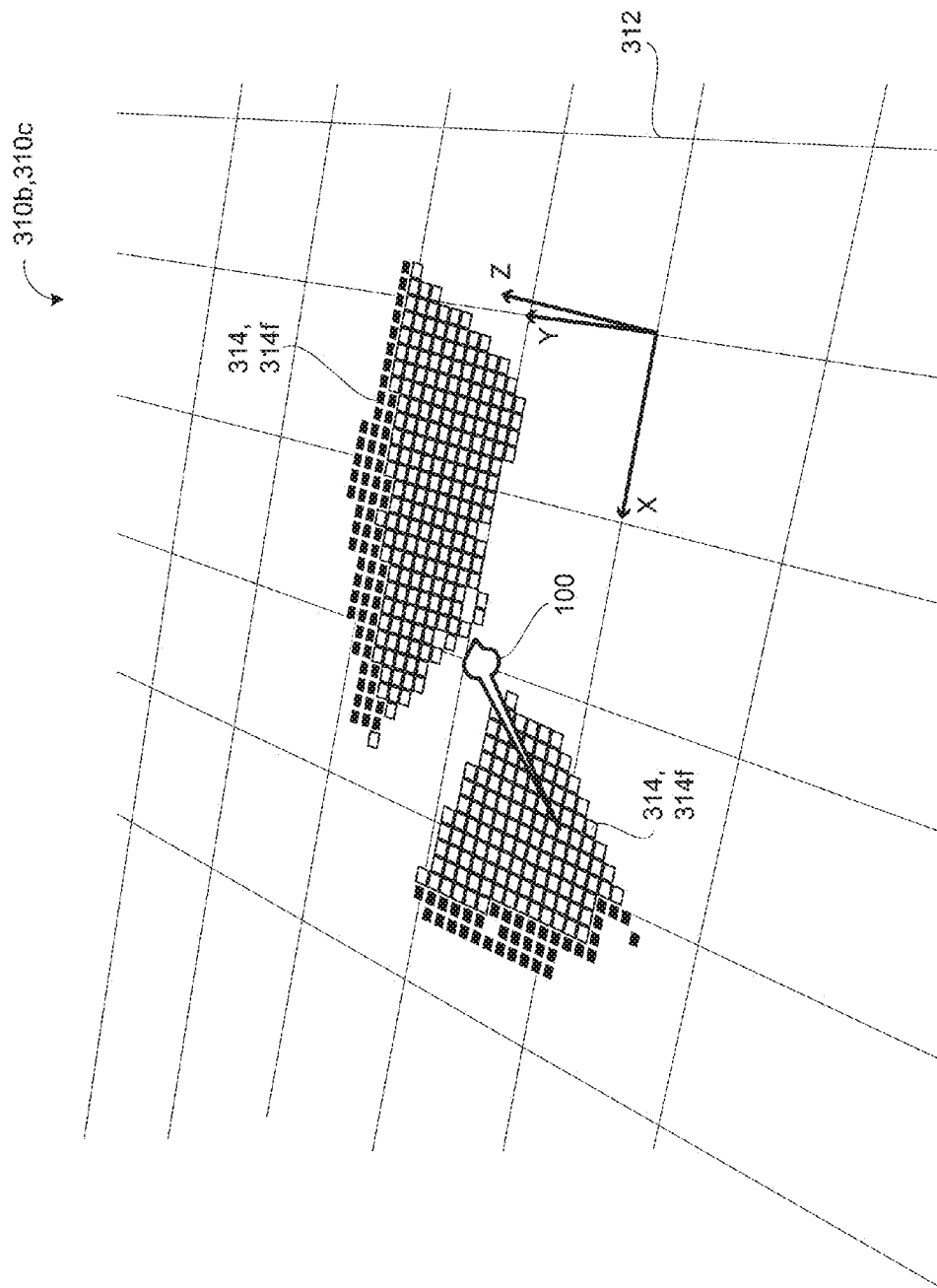
FIG. 4D is schematic view of an exemplary occupancy grid map.

As illustrated in FIGS. 4A and 4C, the SLAM controller 350 may receive an input of imagining sensor data estimating locations of features 424 of the environment 10 relative to a floor plane 5 using ground segmentation. The SLAM controller 350 receives distance estimates of where the floor 5 meets a wall 7 or where the floor 5 meets an object 12 and provides range information to those floor-object intersection locations.

From the individual position hypotheses of the particles 340$_n$, the particle filter 352 may select the hypothesis of the particle 340$_n$ having the highest weight as a best position hypothesis of the robot 100 at a current time. Additionally or alternatively, the particle filter 352 may select several or all particles 340 and compute a weighted average of the position hypotheses of the robot 100 to determine a current location (hypothesis) of the robot 100. The robot controller 500 can use the position hypothesis of the selected particle(s) 340$_n$ and its associated maps 310 to determine a way point for issuing a drive command to the drive system 200. In other words, the robot controller 500 uses the maps 310 of the selected particle 340$_n$ to navigate at that given moment in time. For example, if the robot has a drive goal to drive from a first room to a second room, the navigation system 300 may take a snapshot of a selected particle 340$_n$ (i.e., position hypothesis and/or maps) at a time of drive command issuance, and perform localization temporarily of that particle's hypothesis and that particle's map(s) 310. The navigation system 300 may use just the map(s) 310 of the selected 340$_n$ particle to create a mini particle hypothesis in just one map 310 to handle a motion error when driving relative to that map 310.

In some implementations, the feature tracker 320 is a service executable on a computing processor (e.g., the robot controller 500) that the SLAM controller 350 can use to track interesting features 424 (e.g., lines and/or points) in a scene 10 captured by the camera(s) 420 as the robot 100 moves about the scene 10. In other words, the feature tracker 320 identifies and tracks features 424 across multiple images 422. The SLAM controller 350 uses the feature tracking to generate an occupancy map 310*a* of the environment about the robot 100.

The SLAM controller 350 may ask the feature tracker for an interesting feature 424 to track from a first image 422a to a second image 422b (frame to frame). The feature tracker 320 identifies a feature 424 of interest, such as a corner or a line where a wall 7 meets the floor 5, and tracks the identified feature 424 from frame to frame. The feature tracker 320 identifies and locates in 2D image space the tracked feature 424 from the first image 422a to the second image 422b. The feature tracker 320 communicates the feature coordinates in 2D space (e.g., x, y) to the SLAM controller 350, which determines where the feature 424 is located in 3D space (e.g., x, y, z) and updates a feature map 310a. The SLAM controller 350 calculates where it expects the feature 424 to be located (e.g., in the image(s) 422) and communicates that expected location back to the feature tracker 320 as feedback.

Figure 5:
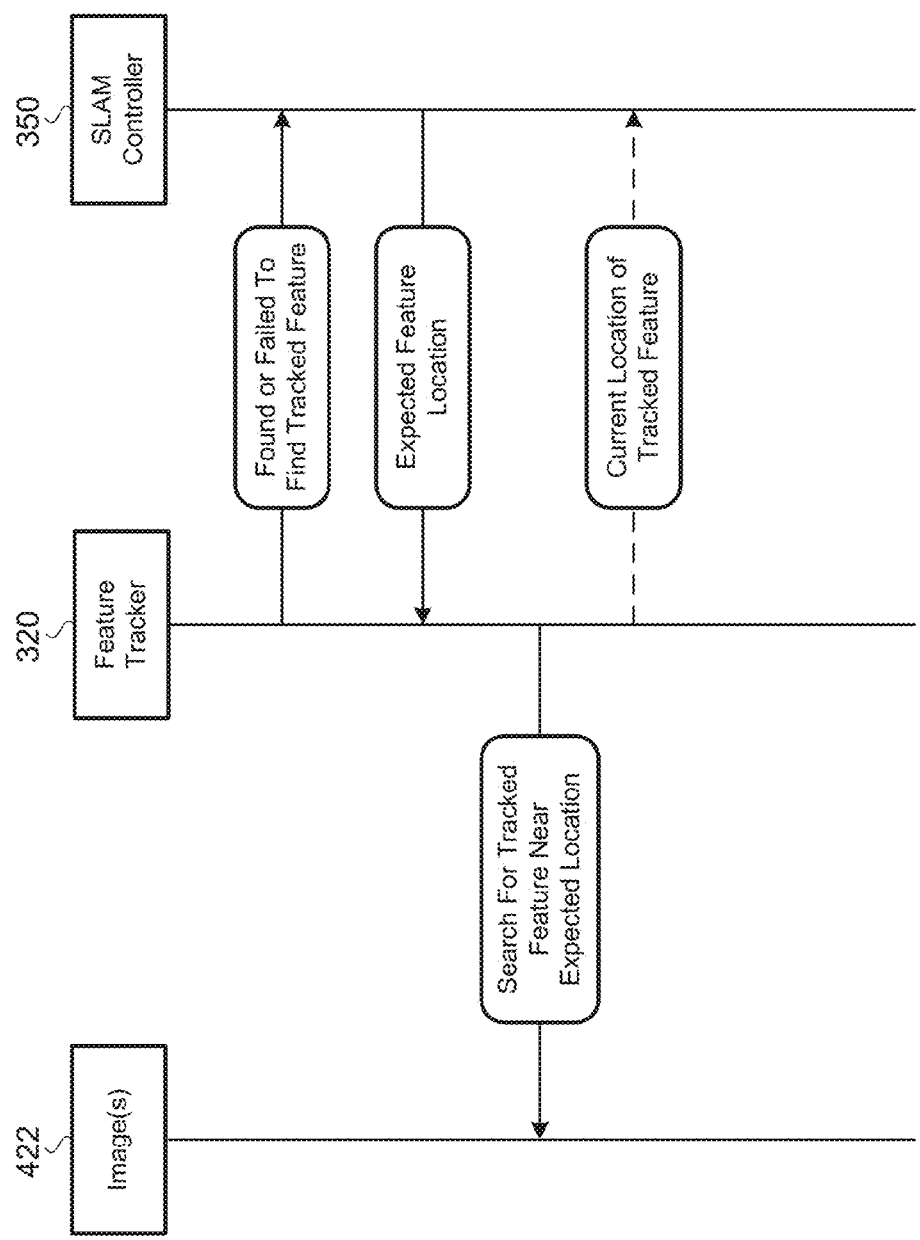
FIG. 5 is a schematic view of interactions between a feature tracker and a simultaneous localization and mapping (SLAM) controller.

Referring to FIG. 5, in some implementations, the feature tracker 320 and the SLAM controller 350 may have a dialog where the feature tracker 320 communicates to the SLAM controller 350 that it found or failed to find the tracked feature 424 at a given location, and the SLAM controller 350 can communicate an expected feature location to the feature tracker 320 to aid the feature tracker's identification and location of the tracked feature 424. For example, the SLAM controller 350 may communicate a probable feature location in the image(s) 422 of the tracked feature 424 to the feature tracker 320. In turn, the feature tracker 320 can concentrate a search for the tracked feature 424 at or about the specified probable feature location in an image 422.

Referring again to FIGS. 3A and 3B, the SLAM controller 350 may execute a particle filter 352, such as a Rao-Blackwellized, that includes a set 345 of particles $340_n$, each representing a hypothesis of the position 342 of the robot 100. The SLAM controller 350 may instantiate each particle $340_n$ with an initial weight 346 (also referred to as a map score) and an empty or default feature dataset. The newly instantiated particles $340_n$ are each equally probable and they all start in the same position. Each particle $340_n$ accumulates information uniquely from received sensor data of the sensor system 400 during execution of the particle filter 352. As a result, the particles $340_n$ may experience different motion noise. As the SLAM controller 350 receives sensor data from the sensor system 400, the particles $340_n$ update their hypotheses of the robot position 342 based on the sensor data. Each particle 340 is scored or receives a weight 346 based on the accuracy of its robot position 342 with respect to the sensor data. For example, if odometry indicates that the robot 100 moved forward 0.5 meters and the robot should expect to see a feature at a particular location with respect to the robot 100, the SLAM controller 350 may attribute a weight 346 to the particle 342 based on how accurate the particle's robot position 342 coincides with received sensor data.

If a particle 340 has an initial weight 346, $W_1$ (e.g., 1.0) and the particle updates one of its maps 310a-c, the SLAM controller 350 may assess a new weight 346, $W_2$ (e.g., 0.8) of the updated particle 340 with respect to the updated map 310a-c. If the particle 340 updates another map 310a-c, the SLAM controller may assess another new weight 346, $W_3$ (e.g., 0.6) for the other updated map 310a-c and combine that weight 346, W with the previous weight the 346, $W_2$ by multiplying the weights 346, $W_2$, $W_3$ together (e.g., $W_1 * W_2 * W_3$). In other words, the SLAM controller 350 may evaluate a weight 346 for the particle with respect to each map 310a-c and then combine the weights 346 with respect to map 310a-c (e.g., by multiplying the weights 346 together) to determine the overall weight 346 of the particle 340. Each particle 340 may have an associated trajectory of the robot 100, which can be used to determine a level of goodness or weight 346 associated with the maps 310a-c. The accuracy of the trajectory (as verified through sensor data) can be directly correlated to the goodness or weight 346 of the maps 310a-c.

For images as sensor data, the SLAM controller 350 may, for each image, interpolate a robot location at a time the image was captured using an estimate of where the robot 100 was at different time points and update the maps 310a-c based on the image data. When the sensor system 400 acquires sensor data from multiple sensors at different times, the SLAM controller 350 may update the maps 310a-c and assess a particle weight 346 for each particle 340 for the sensor data at a given time point, and then successively again at subsequent time points.

In some implementations, each particle $340_n$ includes one or more associated maps 310, such as a feature map 310a, a variance occupancy map 310b, and/or a ground plane occupancy map 310c providing the hypothesized robot location. For example, each particle may include a map 310 conditioned on where the particle $340_n$ thinks the robot 100 moved (e.g., a trajectory of the robot 100). The particles $340_n$ may have associated weight(s) 346 that the SLAM controller 350 scores to determine which particle $340_n$ has the most accurate representation or closest hypothesis to reality. In other words, the particles 340 compete with each other to be classified as the "best" particle $340_n$, having the highest weight 346. In some implementations, the particles $340_n$ self-replicate and the "bad" particles (i.e., low scoring particles $340_n$) are terminated, thus allowing relatively better scoring particles 340 to continue and optionally multiply. As the robot 100 moves, the particles $340_n$, receive updated robot motion information, such as sensor data from the sensor system 400, as well as observations from the feature tracker 320. The updates may occur every clock cycle or every threshold number of clock cycles of the robot controller 500 or the SLAM controller 350. After receiving sensor data and feature observations, the particles $340_n$ update their hypothesis and maps 310 and the SLAM controller 350 updates the weights 346 of each particle $340_n$, so that it can identify a current "best" particle $340_n$.

Figure 6:
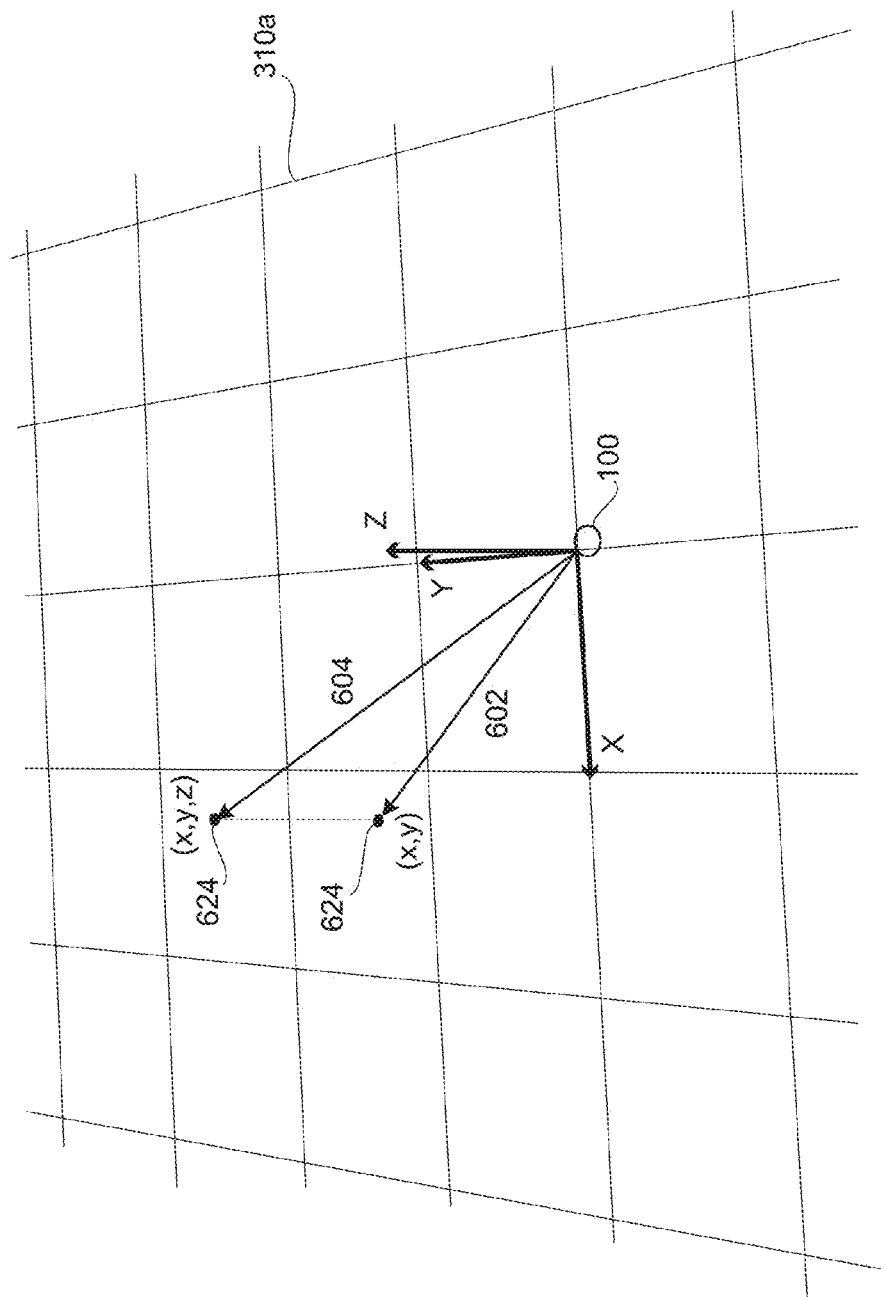
FIG. 6 is schematic view of an exemplary occupancy grid map with estimate three-dimensional coordinates for an exemplary feature point.

Referring to FIG. 6, in some implementations, each particle $340_n$ may has an associated feature map 310a providing a set of locations x, y for feature points 624 corresponding to features 424 in the environment about the robot 100 (see also FIGS. 4A and 4C). Using the 2D coordinates x, y of tracked feature point(s) 624 received from the feature tracker 320, the SLAM controller 350 updates the feature maps 310a of each particle $340_n$. Each particle 340 estimates a 3D location x, y, z of the feature point 624 of the tracked feature 424, for example, using a Kalman filter. The estimated 3D location x, y, z of the feature point 624 may be parameterized such that the feature 424 has an initialization point of where the camera 420 was located when the feature 424 was initialized, a direction vector 602 from the robot 100 (or the camera 420) to the feature 424, and an inverse depth 604 to the feature 424. The inverse depth 604 provides relatively more linear errors than a regular depth.

The feature tracker 320 may communicate identification of a feature 424 at a current location x, y of the robot 100 to the SLAM controller 350, and the SLAM controller 350 may classify that feature 424 as a landmark for localization. In some examples, the initialization point x, y of a feature 424 is fixed; however, the direction vector 602 (e.g., a range) may have some error or variance. As the robot 100 moves, the SLAM controller 350 receives sensor data updates from different angles (i.e., from different perspectives of the scene 10), allowing the particle $340_n$ to refine its estimate of the 3D coordinates x, y, z of the landmark feature point 624 (e.g., using normal Kalman filter rules). By using a particle filter 352 (e.g., with inverse depth parameterization), the SLAM controller 350 can separate or spit-up land mark estimations.

In some examples, the SLAM controller 350 provides an estimated location x, y, z of each landmark feature 424 and a corresponding uncertainty that is based on the parameters used for estimating the landmark location, which provides a covariance estimate. The covariance may be an estimate of the uncertainty and the estimated position and how that uncertainty is shaped (e.g., along one line or evenly spread out). The SLAM controller 350 may generate a vector for a feature state and a covariance matrix representing the uncertainty of that feature state.

Covariance is a measure of how much two random variables change together. If the greater values of one variable mainly correspond with the greater values of the other variable, and the same holds for the smaller values, i.e. the variables tend to show similar behavior, the covariance is a positive number. In the opposite case, when the greater values of one variable mainly correspond to the smaller values of the other, i.e. the variables tend to show opposite behavior, the covariance is negative. The sign of the covariance therefore shows the tendency in the linear relationship between the variables.

The joint probability of the robot position 344 can be expressed in terms of the robot trajectory 342 and landmark positions as:

$$P(\vec{x}, \vec{l}_1, \vec{l}_2, \vec{l}_3 \ldots \vec{l}_n) = P(\vec{l}_1, \vec{x}) P(\vec{l}_2, \vec{x}) P(\vec{l}_3, \vec{x}) \ldots P(\vec{l}_n, \vec{x}) \quad (1)$$

where $\vec{x}$ is the robot trajectory 342 and $\vec{l}_n$ is a landmark position.

The feature tracker 320 receives an estimated image position for a feature point 624 with an associated uncertainty in terms of image position. The SLAM controller 350 may evaluate a matching probability between landmark position estimates of the feature tracker 320 and those of a particle $340_n$. In other words, the SLAM controller 350 may evaluate a probability of matching between a vector (i.e., a direction and distance) to a feature point 624 of a landmark feature 424 from the robot 100 provided by the feature tracker 320 and a corresponding vector provided by a particle $340_n$. For example, if the feature tracker 320 indicates that a landmark is 5 degrees to the left of the forward drive direction F of the robot 100, and a first particle $340_1$ indicates that the landmark should be along the forward drive direction F, the SLAM controller 350 may determine an error or disparity between the two estimates and a probability of matching. In this case, the probability of matching may be relatively low compared to another particle $340_2$ indicating that the landmark should be 4.9 degrees to the left of the forward drive direction F of the robot 100, which is much closer to the feature tracker estimate.

The SLAM controller 350 may update the particles $340_n$ in a probabilistic manner using a robot motion model 360. The robot motion model 360 provides a probability distribution of new positions to which the robot 100 may have moved (e.g., based on odometry and/or an IMU 470). For example, if the SLAM controller 350 estimates that the robot 100 moved forward one meter, but with some error in that movement, rather than updating all of the particles $340_n$ by moving them all forward one meter, for each particle $340_n$, the SLAM controller 350 generates a sample based on a position distribution of the robot motion model 360 centered on one meter of forward movement with a threshold variance (e.g., 10%). A first particle $340_1$ may receive a sample of 0.9 meters of forward movement. A second particle $340_2$ may receive a sample of 1.1 meters of forward movement. A third particle $340_3$ may receive a sample of 1.05 meters of forward movement, and so on, such that each particle $340_n$ receives its own sample based on the position distribution. The SLAM controller 350 can update each particle $340_n$ for motion based on its received sample.

The feature tracker 320 may execute a scale-invariant feature transform (SIFT) to detect and describe local features 424 in captured images 422. For any object 12 in an image, interesting points on the object 12 can be extracted to provide a "feature description" of the object 12. This description, extracted from a training image, can then be used to identify the object 12 when attempting to locate the object 12 in a test image containing many other objects. To perform reliable recognition, it is important that the features extracted from the training image be detectable even under changes in image scale, noise and illumination. Such points usually lie on high-contrast regions of the image, such as object edges. For object recognition and detection, the robot 100 may use a SIFT to find distinctive key points that are invariant to location, scale and rotation, and robust to affine transformations (changes in scale, rotation, shear, and position) and changes in illumination. In some implementations, the robot 100 captures multiple images (using the camera 320 and/or imaging sensor 450) of a scene 10 or object 12 (e.g., under different conditions, from different angles, etc.) and stores the images, such as in a matrix. The robot 100 can access the stored images to identify a new image by comparison, filter, etc. For example, SIFT features can be obtained from an input image and matched to a SIFT feature database obtained from training images (captured previously). The feature matching can be done through a Euclidean-distance based nearest neighbor approach. A Hough transform may be used to increase object identification by clustering those features that belong to the same object and reject the matches that are left out in the clustering process. SURF (Speeded Up Robust Feature) may be a robust image detector & descriptor.

In SIFT, multiple image levels are each searched and a maximum is chosen. In SURF, the image is kept the same size, but the size of the feature is varied. The SLAM controller may execute hybrid routine that includes searched a set of scaled images, but upon identifying a feature 424 within a scaled image, the feature tracker 320 conducts a local search (e.g., to provide a better description of that scaled image).

Figure 7A:
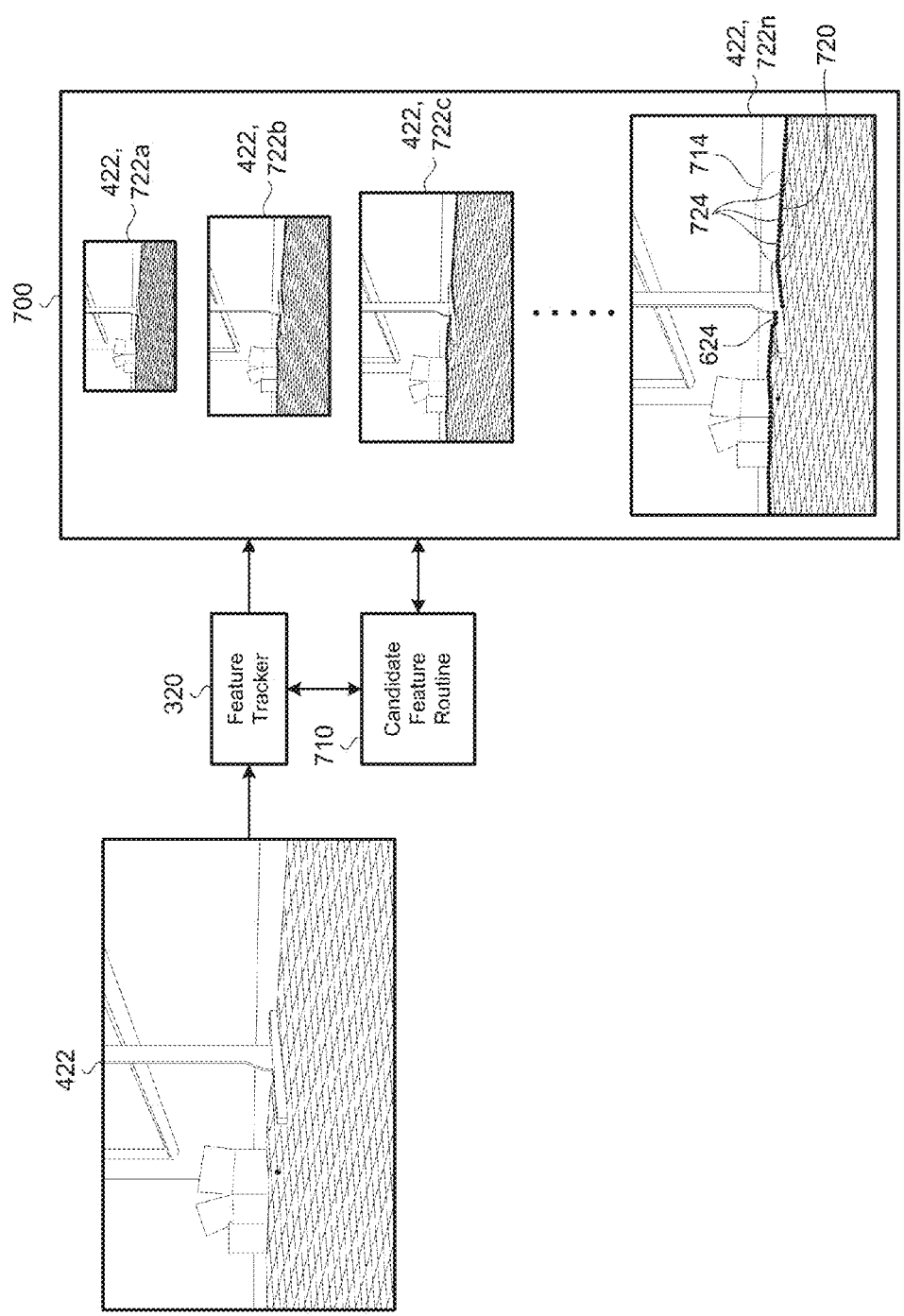
FIG. 7A is schematic view of an exemplary feature tracker constructing an image pyramid.
Figure 7B:
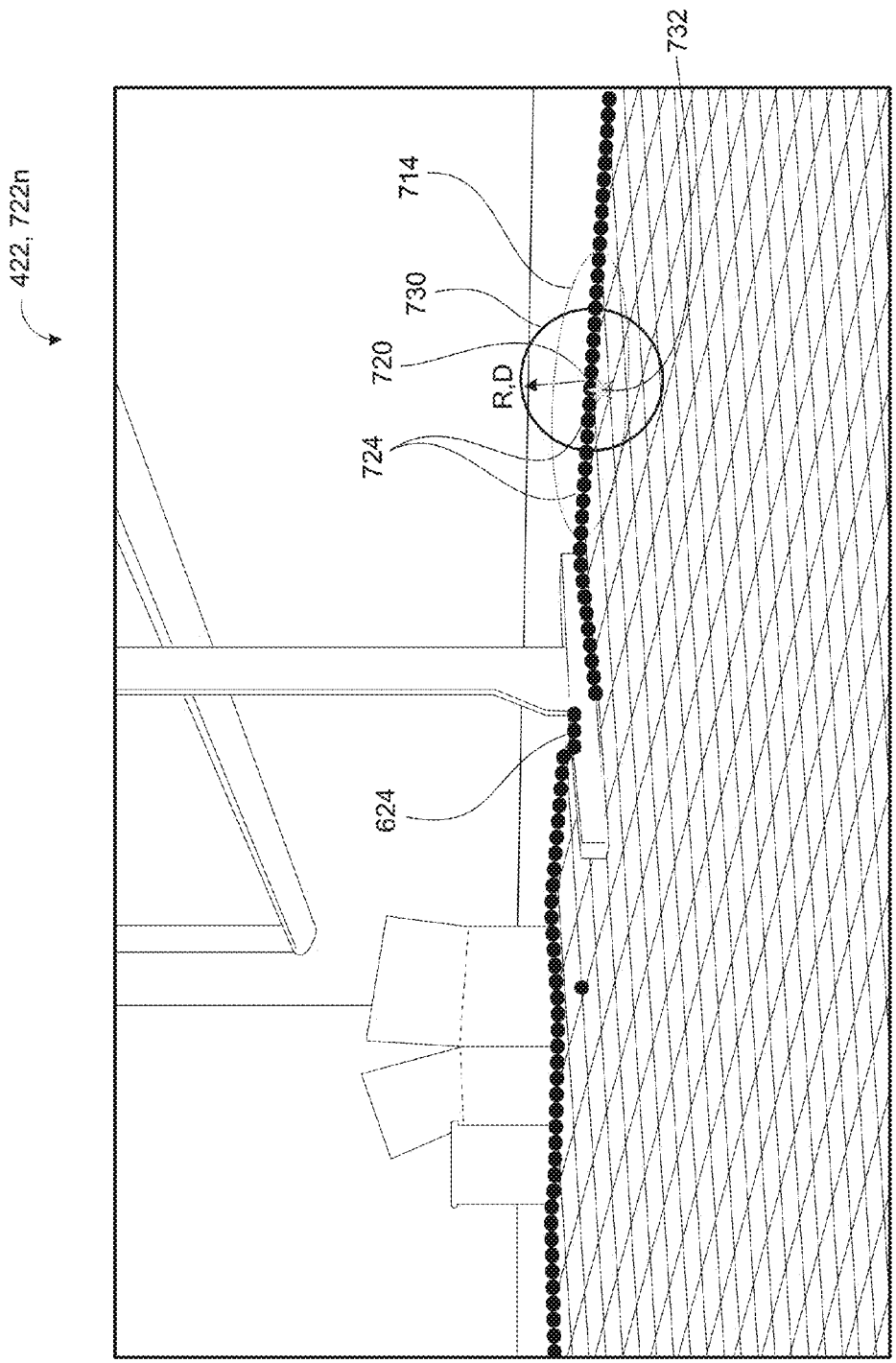
FIG. 7B is schematic view of an exemplary scaled image.

Referring to FIGS. 7A and 7B, feature scale refers to how large a feature 424 appears in an image 422. The scale of a feature 424 increases as the robot 100 moves closer to that feature 424. For example, the scale of a feature 424 in a first image 422a at a first distance may be half of the scale of that feature 424 in a second image 422b at second distance equal to half the first distance. To track a feature 424 across images (frames) 422, the feature tracker 320 may create an image pyramid 700 that includes a set of scaled images 722a-n. The feature tracker 320 scales an image 422 up and/or down by threshold factor(s) to create the scaled images 722a-n.

In some implementations, the feature tracker 320 receives an image 420 (e.g., from a camera) and identifies features 424 (e.g., interesting points or lines) in the image 420 by scaling the image 422 by different amounts to produce an image pyramid 700. Within each scaled image 722a-n, the feature tracker 320 executes a candidate feature routine 710 to identify a set 714 of candidate feature points 724. In some implementations, the candidate feature routine 710 calculates a Harris Corner Score, which is a corner detection response function that assigns a high value for things or features that are corner-like. The feature candidate routine 710 keeps feature points 724 having Harris Score responses that are equal or nearly equal to a local maximum in a small area (a threshold area), while discarding the remaining feature points 624. The feature candidate routine 710 may executes a non-maximal suppression sub-routine that associates a Harris Corner Score with every pixel of the image 422, 722 and then identifies a pixel (i.e., a point 720, 724) having a Harris Corner Score larger than its neighbors (e.g., a local maximum). The feature candidate routine 710 may keep the pixel/point 720, 724 having the local maximum Harris Corner Score as well as neighboring pixel/points 720, 724 or those within a threshold distance. Throwing out pixel/points 720, 724 that are not neighbors or within a threshold distance saves processing time and computational resources. Moreover, keeping the neighboring pixel/points 720, 724 or those within a threshold distance, versus just the local maximum pixel/point 720, 724 compensates for slight variations in matching of images 722n between frames, allowing more robust feature matching.

In some examples, the feature candidate routine 710 adheres to a rule of keeping a pixel of a scaled image 722n as a candidate feature point 724 if the Harris Score of that pixel is either a local maximum within a 10 pixel radius or is within 20% of the maximum Harris Score within a 10 pixel radius. In other words, if the Harris Score of the feature point 624, 724 is either the maximum or within a threshold range of the maximum Harris Score within a threshold radius R (or a threshold area bounded by any shape), the feature candidate routine 710 keeps that feature point as a candidate feature point 724 in the set 714 of candidate feature points 724. Otherwise, that feature point 624 is discarded. The feature tracker 320 executes the feature candidate routine 710 on some or all of the scaled images 722n (also referred to as scale levels) in the image pyramid 700. The feature tracker 320 uses the set 714 of candidate feature points 724 as possible feature points 624 to track.

The SLAM controller 350 may ask the feature tracker 320 to provide a feature point 324, 724 from its set 714 of candidate feature points 724 to track that is not close (e.g., within a threshold distance) to any currently tracked feature points 624. The feature tracker 320 may select a feature point 724 from the set 714 of candidate feature points 724 as a key point 720 (i.e., a tracked point) and generate a descriptor 730 for the key point 720 that includes other feature points 724 from the set 714 of candidate feature points 724 within a threshold distance D of the key point 720 (the selected feature point). The descriptor 730 provides an image patch around the key point 720 that describes what the image looks like around that feature point 720, 724. The feature tracker 320 may use the descriptor 730 for identifying features 424 in a next frame or subsequent image 422.

For example, the feature tracker 320 may try to match the feature points 724 of the descriptor 730 to features 424 in the next frame 422.

In some implementations, the feature tracker 730 uses the set 714 of candidate feature points 724 or image patch as the descriptor 730. Moreover, the feature tracker 320 may calculate a centroid 732 of the image patch/descriptor 730 or a region about the key point 720 in the corresponding scaled image 722n (image level) of the key point 722 (feature point of interest) in the image pyramid 700. The feature tracker 320 may determine a location of the centroid 732 by subtracting a brightness weighted average X position and a brightness weighted average Y position from an x, y position of the key point 720. A vector therebetween forms the direction vector, which can be used for determining rotational variance.

In some implementations, to generate the descriptor 730, the feature tracker 320 samples feature points 624,724 on the scaled image 722n of the key point 720 (e.g., treating the image as a grid) and records a corresponding brightness level. For example, the feature tracker 320 may sample feature points 724 every threshold number of pixels apart (e.g., 1, 3, 5, etc. pixels apart) on the scaled image 722n. The feature tracker 320 may normalize the samples (the brightness levels) to have a mean of zero and a variance of one. Normalizing the mean to zero, makes the descriptor 730 insensitive or invariant to brightness changes and normalizing the variance to one makes the descriptor 730 insensitive or invariant to contrast changes, both improving feature tracking performance. Rotational variance can be calculated by rotating feature points 724 of the image patch 730 by a threshold angle before sampling the image patch 730. Moreover, the feature tracker 320 may blur the scaled image 722n (e.g., by a Gaussian of a certain size) before sampling the feature points 724, for example when the feature points 724 are relatively far apart, which makes the descriptor 730 relatively more invariant to rotation. In some examples, the feature tracker 320 samples every feature point 624, 724 of the scaled image 722n, rather than just the candidate feature points 724 of the image patch 730. This aids description between pixels, so that if the image 422 is offset, such as by a fraction of a pixel, the feature tracker 320 may match up the image patch 730 with the image 422.

Blurring the scaled image 722n before sampling the feature points 724 allows getting a weighted average around a sample point 724. The sample points 724 are generally not every pixel. Therefore, there may some pixels in between the sample points 724. The blurring allows sampling over an area with respect the sample points 724 (e.g., an area bound by a radius D about each point 720,724), providing averaging of more data than without blurring to make the sampling less sensitive to noise. The amount of blurring may be proportional to a size of the area about each point 720, 724 used in averaging of data about those points 720, 724, which can be beneficial in accounting for scale changes. The SLAM controller 350 may associate the weighted average with a pixel of the corresponding sample point 724, thus allowing association of a representation of an area about that pixel with that pixel location.

To generate the descriptor 730, the feature tracker 320 may crop the scaled image 722n to a region about the key point 720 (e.g., a region bounded by a threshold radius R from the key point 720), ignoring feature points 624 outside of the cropped region. The feature tracker 320 may then sample the feature points 724 of the image patch 730 within the cropped region and normalize the sampled feature points 724 to have a mean of zero and a variance of one. The normalized sampled feature points 724 form the descriptor 730. If the feature tracker 320 considers rotational variance, it may rotate the feature points 724 of the image patch 730 by an angle before sampling those feature points 724.

Figure 7C:
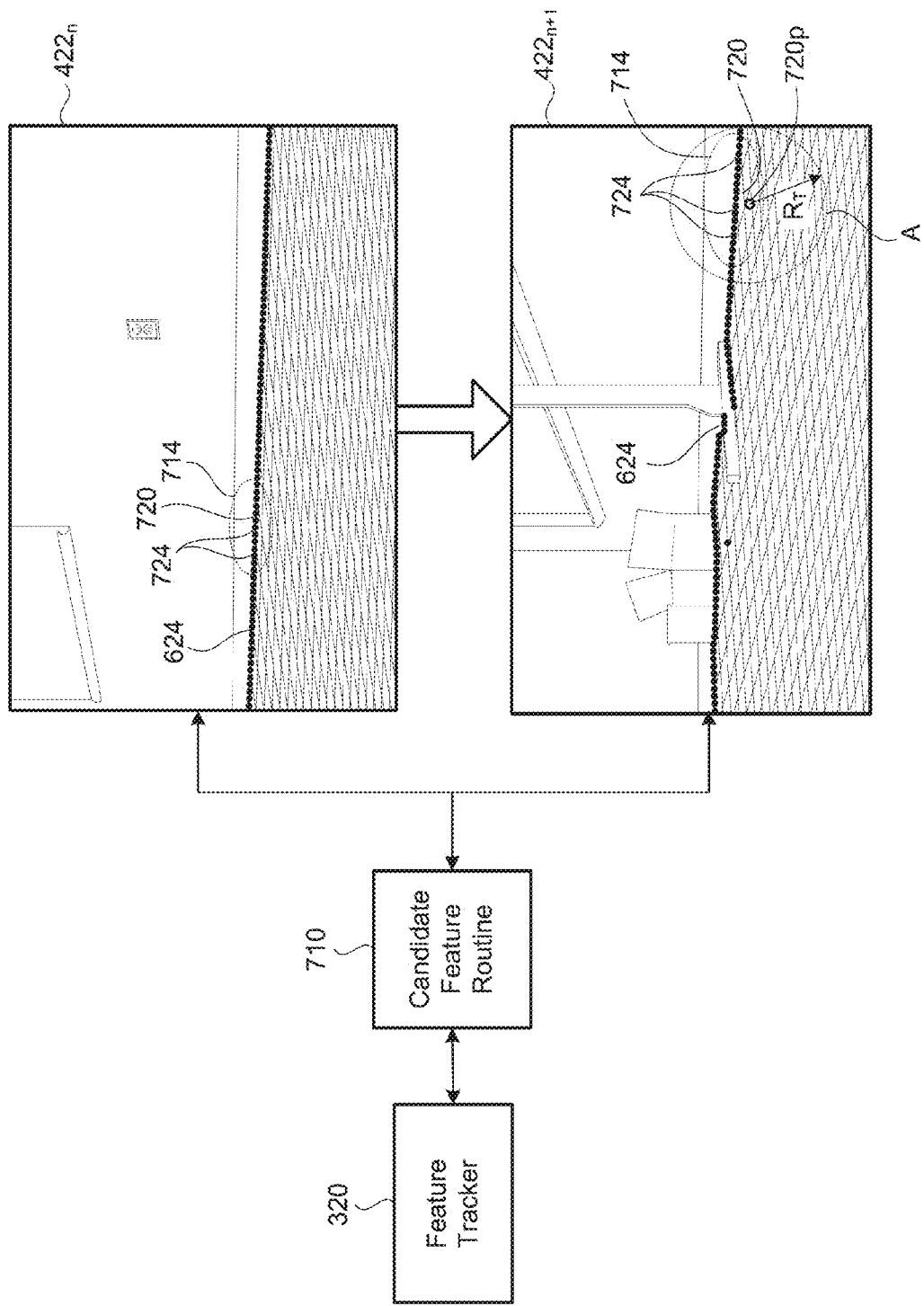
FIG. 7C is schematic view of an exemplary feature tracker executing a candidate feature routine on first and second images.

Referring to FIG. 7C, n some implementations, the feature tracker 320 executes the candidate feature routine 710 on the next frame $422_{n+1}$ to identify a corresponding set 714 of candidate feature points 724. The feature tracker 320 also generates descriptors 730 for each candidate feature point 724. To find the key point 720 (or any other feature point 624) of the previous frame 422 in this next frame $422_{n+1}$, the feature tracker 320 compares the descriptor 730 of the key point 720 of the previous frame $422_n$ in with the feature descriptors 730 of the next frame $422_{n+1}$ to determine which corresponding feature point 624, 724 of the next frame $422_{n+1}$ matches or nearly matches the key point 720 of the previous frame $422_n$. The matching feature point 720 of the next frame $422_{n+1}$ becomes the key point 720 (e.g., the estimated feature location) in the new frame $422_n$. The feature tracker 320 may limit its search for the key point 720 in the next frame $422_{n+1}$ to part of that frame $422_{n+1}$ (e.g., within and area A bounded by a threshold radius $R_T$ of the previous location $720p$) or use the whole frame $422_{n+1}$. For example, the feature tracker 320 may compare a set of feature descriptors 730 within a threshold radius of the key point location of the previous frame 422.

Each feature descriptor 730 may be a vector of floating point numbers. The feature tracker 320 may compare two feature descriptors 730 (e.g., of two sequential frames $422_n$, $422_{n+1}$) by taking the difference between each of the corresponding floating point numbers, taking the absolute value of that difference, and then taking the sum of the absolute values over the entire descriptors 730, resulting in a matching score. In other words, the feature tracker 320 may calculate an L1-norm distance between the two feature descriptors 730. The feature tracker 320 may deem the features 424 as matching when the comparison results in a matching score below a threshold matching score. So, when comparing descriptors 730 of candidate feature points 724 of the next frame $422_{n+1}$ with the descriptor 730 of the key point 720 of the previous frame $422_n$, the feature tracker 320 may select the feature point 724 of the next frame $422_{n+1}$ having the lowest matching score as the matching feature point 724 for the key point 720 of the previous frame $422_n$. The selected feature point 724 becomes the key point 720 of the next frame $422_{n+1}$ (i.e., the tracked feature point). In some examples, if the feature descriptor comparisons all result in matching scores above the threshold matching score, the feature tracker 320 either continues searching for the matching feature point 624, 724 in other portions of the next frame $422_{n+1}$ (the image) or returns with no match.

In some implementations, the feature tracker 320 searches every scaled image $722a$-$n$ of an image 422 to identify a tracked feature 424 as the robot 100 moves closer or away from that feature 424. For example, the feature tracker 320 may search the respective image pyramids 700 of first and second images $422a$, $422b$ to find a common feature point 624, 720, 724. Alternatively, to increase the efficiency of processing an image pyramid 700, after locating a feature point 624 on a scaled image $722n$, the feature tracker 320 may conduct a local search in an area A around that feature point 624 to obtain a relatively better estimate of that scaled image $722n$, which the feature tracker 320 may use to generate the feature descriptor 730. In some examples, the feature tracker 320 limits its search for the key point 720 within the next frame $422_{n+1}$ to a search window or search area A. This reduces processing time and utilization of robot resources. The search area A can be based on the location of the key point 720 in the previous frame $422_n$ and/or the robot motion (e.g., a robot trajectory) and optionally a robot motion error. If the feature tracker 320 knows where the key point 720 was in the previous frame $422_n$, some information on how the robot moved, and account for a movement error corresponding to what it does not know about the robot movement, the feature tracker 320 can specify a search area A about a portion of the next frame $422_{n+1}$, rather than searching the entire frame $422_{n+1}$. For example, if the feature tracker 320 receives a drive speed of the robot 100, but no bearing, the feature tracker 320 knows the rate at which feature points 624, 724 can move away from a current location between frames 422, based on a frame rate. This may result in a rather large search area A, such as the area bound by a robot motion drive vector in all directions, but the search area may be less than the entire next frame 422. If the feature tracker 320 receives a drive vector (i.e., a drive trajectory based on odometry, an internal measurement unit (IMU), etc.), the feature tracker 230 can localize the search area A to an area about an end point of the drive vector. In some implementations, the feature tracker 320 receives feedback from the SLAM controller 350 and determines the search area A based on that feedback. The feature tracker 320 can identify and analyze feature points 624, 724 in the search area A and ignore feature points 624, 724 outside of the search area A when trying to locate a match for the key point 720 in the next frame $422_{n+1}$.

Figure 3A:
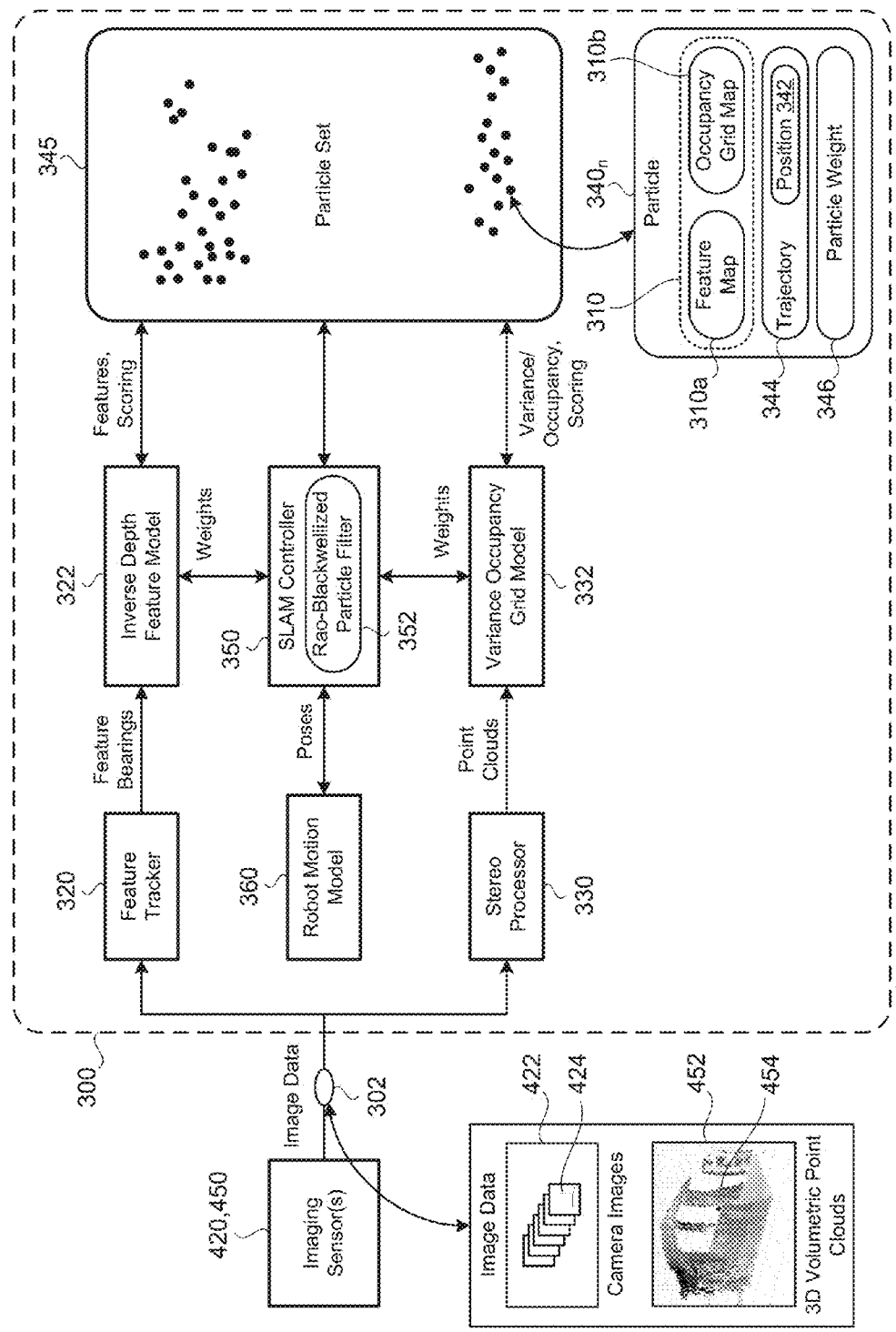
FIGS. 3A and 3B are schematic views of exemplary navigation systems for a mobile robot.
Figure 3B:
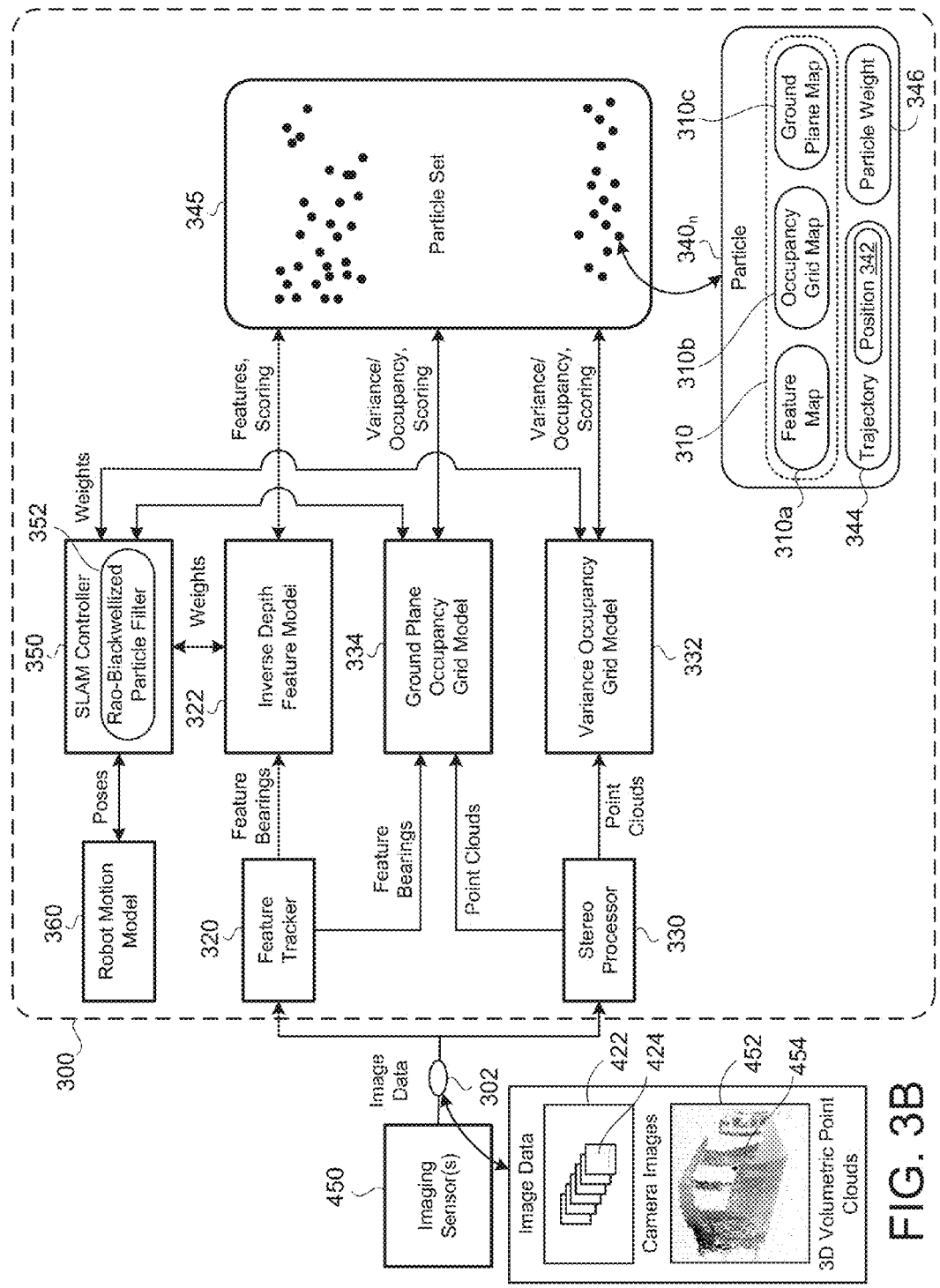
Figure 8A:
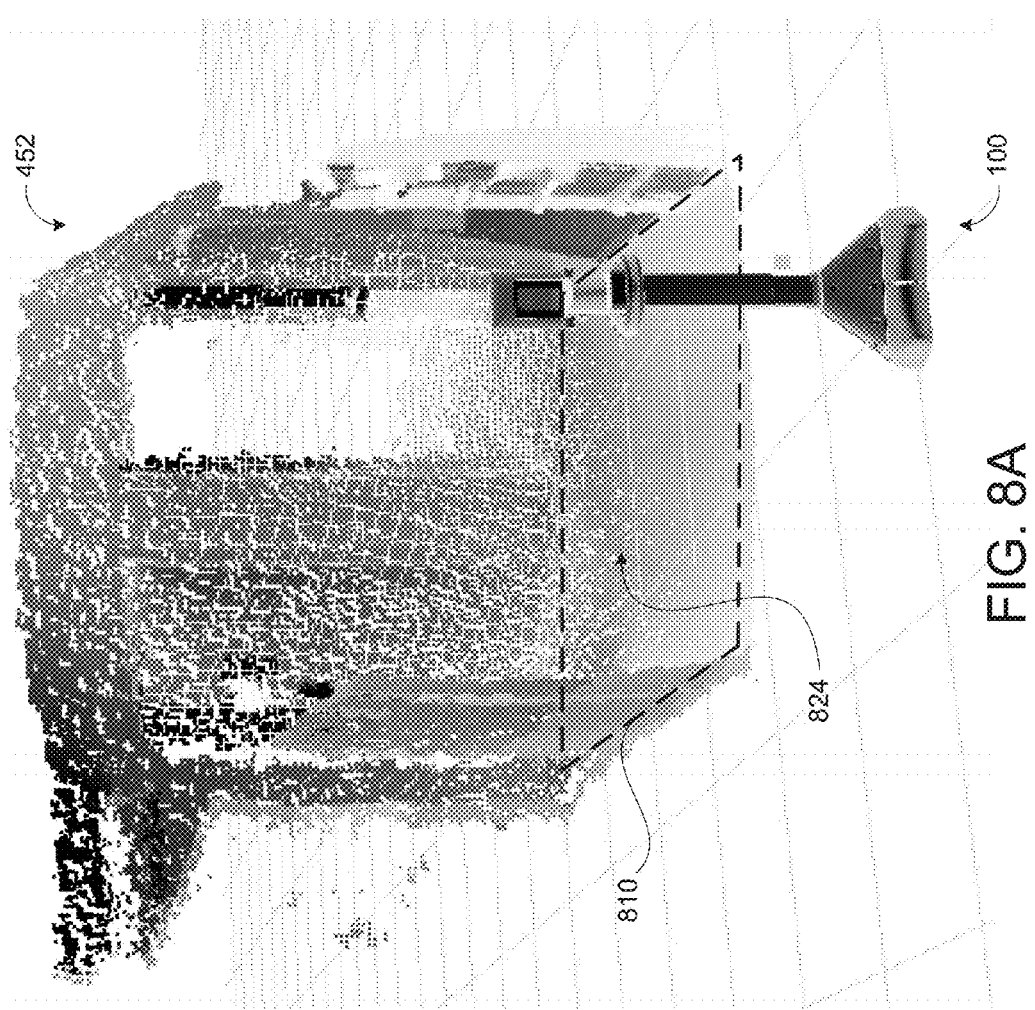
FIGS. 8A and 8B are schematic views of exemplary ground planes disposed on point cloud renderings of a scene.
Figure 8B:
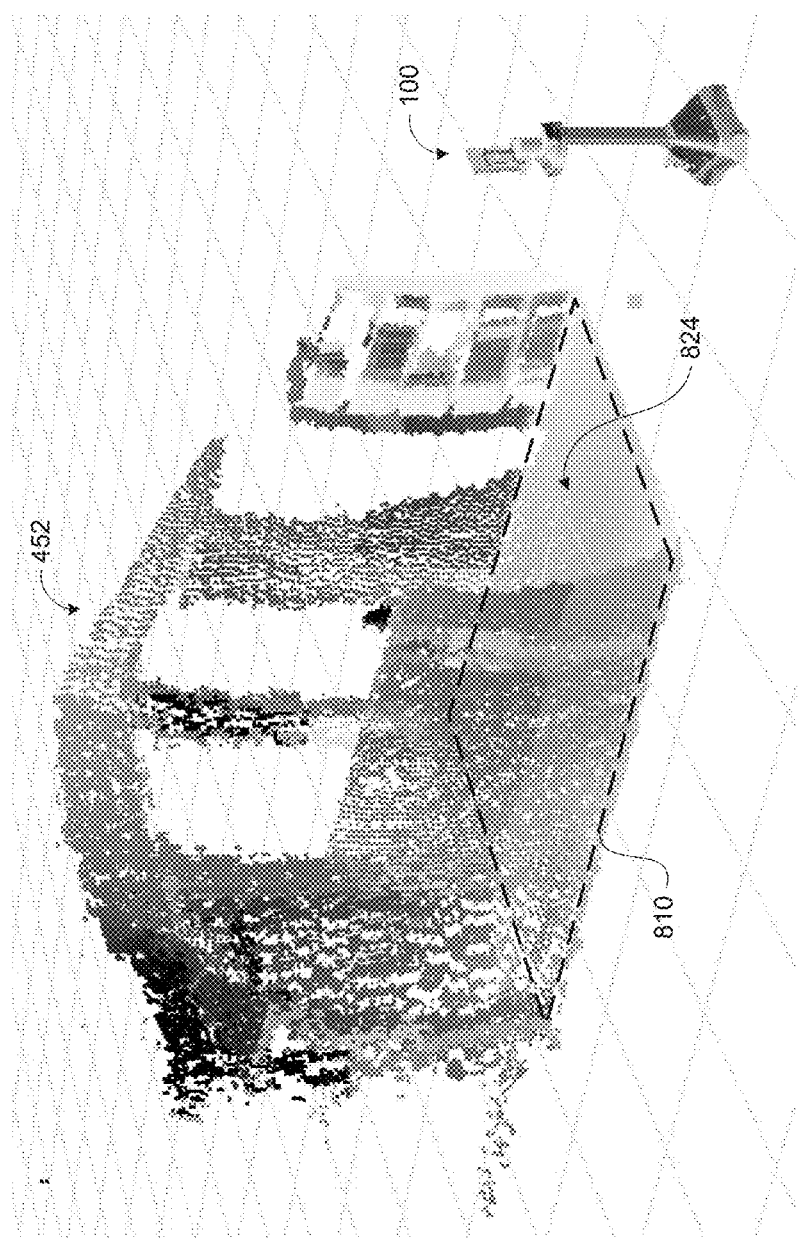

Referring to FIGS. 3B, 8A and 8B, in some implementations, the SLAM controller 350 receives a dense point cloud 452 from the stereo processor 330 (e.g., based on inputs from the right and left stereo cameras $420r$, $420l$ and/or a 3D imaging sensor 450). The SLAM controller 350 may produce a ground plane map $310c$ by identifying ground plane points 824 in the received point cloud 452 and fitting a plane 810 to the identified ground plane points 824. In some examples, the SLAM controller 350 may anticipate a location of the ground plane 810, such as at a height of zero where the drive wheels 210 meet the ground 5. The cameras $420r$, $420l$ may be at a camera height above the ground 5.

The SLAM controller may build a statistical ground plane model 334 to identify the ground plane 810 using a collection of pixels or image points that correspond to the ground 5 and another collection of pixels or image points that correspond to non-floor areas (e.g., walls or objects). Using the ground plane model 334, the SLAM controller 350 may determine a probability of whether a particular pixel or image point 824 is on the ground 5 (e.g., if a particular pixel or image point is "ground-like"). The SLAM controller 350 may construct an occupancy map $810c$ using those statistical determinations. For example, pixels or image points 824 deemed part of the ground or floor 5 can be marked on the occupancy map $310c$ as free or open space, whereas pixels or image points deemed not part of the ground or floor can be marked as occupied locations on the occupancy map $310c$. In the examples shown in FIGS. 4A and 4D, grid cells $314f$ part of the ground plane 5 can be marked as free or unoccupied, whereas cells $314o$ not part of the ground plane 5 can be marked as occupied.

Figure 9:
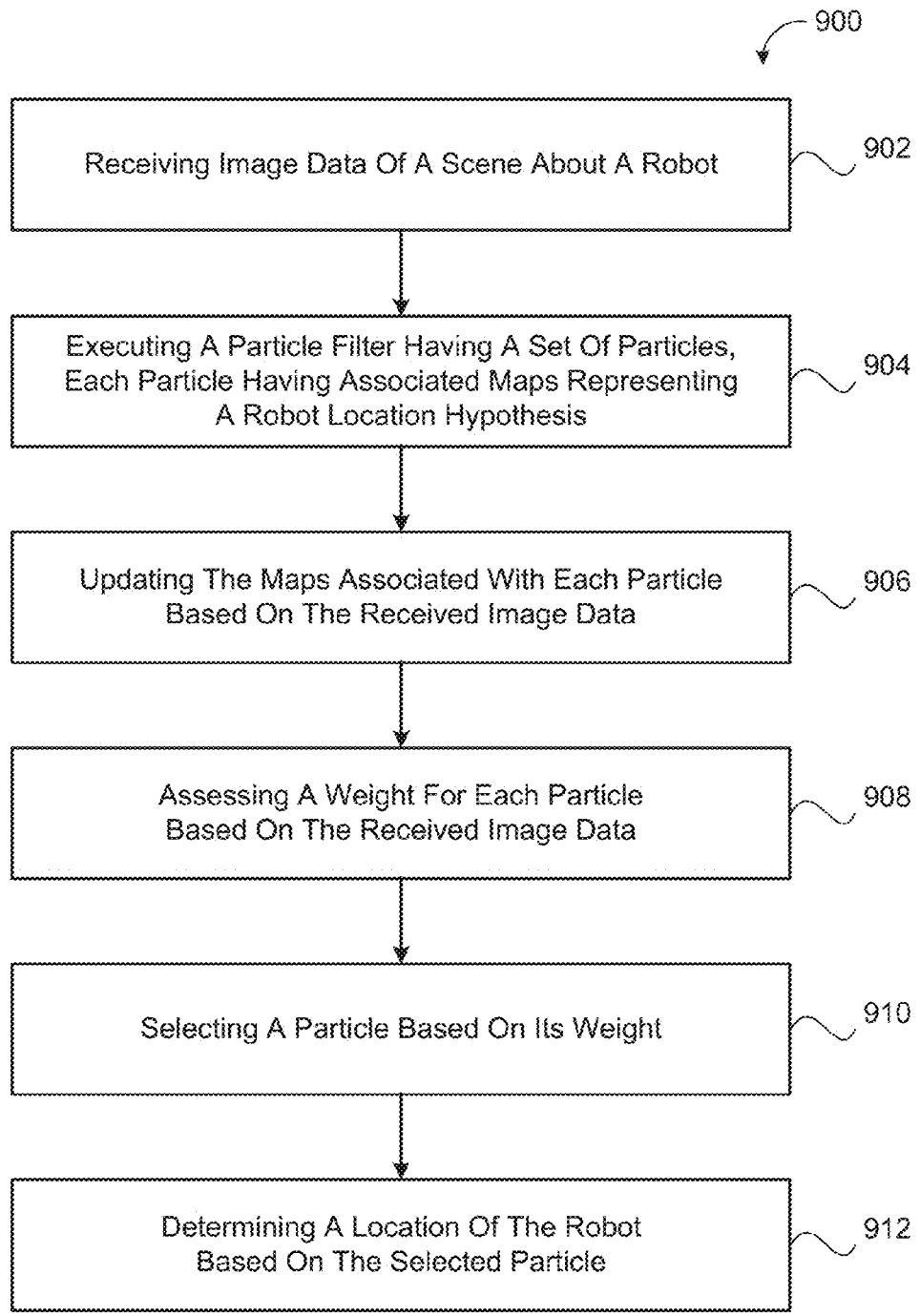
FIG. 9 provides an exemplary arrangement of operations for a method of localizing a mobile robot.

FIG. 9 provides an exemplary arrangement 900 of operations for a method of localizing a mobile robot 100. The method includes receiving 902 image data 302 of a scene 10 about the robot 100 and executing 904 a particle filter 352, such as a Rao-Blackwellized particle filter, having a set 345 of particles $340_n$. Each particle $340_n$ has associated maps 310 (e.g., a feature map $310a$, a variance occupancy grid map $310b$, and/or a ground plane occupancy grid map $310c$) representing a robot location hypothesis. The method further includes updating 906 the maps 310 associated with each particle $340_n$ based on the received image data 302, assessing 908 a weight 346 for each particle $340_n$ based on the received image data 302, selecting 910 a particle $340_n$ based on its weight 346, and determining 912 a location of the robot 100 based on the selected particle $340_n$.

Referring also to FIGS. 3A-8B, in some implementations, the method include receiving a three-dimensional point cloud 352 and accumulating cloud points 454 in cells 314 of the variance occupancy grid map $310b$ based on x, y coordinates of the cloud points 454. Each cell 314 accumulates a height variance based on a z coordinate of the accumulated cloud points 454. The method may include receiving a three-dimensional point cloud 452, identifying ground plane cloud points 824, fitting a ground plane 810 to the ground plane cloud points 824, and updating the ground plane occupancy grid map $810c$.

The method may include receiving an image 422 of the scene 10 about the robot 100 and instantiating an image pyramid 700 including a set of scaled images $722n$. Each scaled image $722n$ has a scale relative to the received image 422. The method further includes identifying at least feature point 624 in the scaled images 722n and updating the feature map 810a. In some examples, the method includes calculating a Harris Corner Score to identify feature points 624 associated with a corner feature 424 of the scene 10. The method may include selecting feature points 624 as candidate feature points 724 that have at least one of a local maximum Harris Corner Score or a Harris Corner Score substantially equal to the local maximum Harris Corner Score in a threshold area. For example, the method may include selecting feature points 624 as candidate feature points 724 that have at least one of a local maximum Harris Corner Score or a Harris Corner Score within about 20% of the local maximum Harris Corner Score within a 10 pixel radius of the feature point having the local maximum Harris Corner Score.

In some implementations, the method includes selecting a feature point 624 of a scaled image 722n as a key point 720 for tracking and producing a descriptor 730 of that key point 720. Moreover, the method may include identifying the key point 720 in a subsequent image 422 using the descriptor 730. The descriptor 730 may include feature points 624, 724 within a threshold distance R, D of the key point 720 on the corresponding scaled image 722n of the key point 720. In some examples, the method includes sampling feature points 724 of the descriptor 730, recording a brightness level for each feature point 724, and normalizing the brightness levels to have a mean of zero and a variance of one. Normalizing the mean to zero, makes the descriptor insensitive or invariant to brightness changes and normalizing the variance to one makes the descriptor 730 insensitive or invariant to contrast changes, both improving feature tracking performance. The method may include blurring the scaled image 722n before sampling the feature points 724, for example when the feature points 724 are relatively far apart, which makes the descriptor 730 relatively more invariant to rotation. Moreover, the method may include rotating the feature points 724 by a threshold angle before sampling the feature points 724. The feature points 724 may be sampled within a threshold area of the scaled image 722n about the key point 720.

The method may include producing a descriptor 730 for each feature point 724 of a set of feature points 714. To identify a common key point 720 among first and second images 422a, 422b, the method may include comparing feature descriptors 730 of the first and second images 422a, 422b. In some examples, the method includes searching respective image pyramids 700 of the first and second images 422a, 422b to find the common feature point 720. The method may include searching within a threshold area A of the scaled images 722n of the images pyramids 700 for the common feature point 720. Moreover, the method may include determining the threshold area A based on at least one of a known previous feature point location or a robot drive trajectory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes aback end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   maneuvering a robot about a scene;
   emitting light onto the scene;
   capturing images of the scene using a depth-perceptive imaging sensor, the images comprising an active illumination image and an ambient illumination image, each image comprising three-dimensional depth data and brightness data;
   executing a particle filter having a set of particles, each particle having an associated occupancy grid map, an associated feature map, and a robot location hypothesis;
   updating the occupancy grid map associated with each particle based on the images;
   for each image:
     instantiating an image pyramid comprising a set of scaled images, each scaled image having a scale relative to the image;
     identifying at least one feature point in the scaled images; and
     updating the corresponding feature map of each particle with the identified at least one feature point;
   determining a location of an object in the scene based on the images and at least one particle of the particle filter;
   assigning a confidence level for the location of the object based on the three-dimensional depth data and the brightness data of the images; and
   maneuvering the robot in the scene based on the location of the object and the corresponding confidence level.

2. The method of claim 1, further comprising:
   receiving a proximity indication of the robot being near the object from a proximity sensor of the robot; and
   in response to the proximity indication, increasing an image capture rate of the depth-perceptive imaging sensor.

3. The method of claim 1, further comprising constructing an object occupancy map of the scene based on the images.

4. The method of claim 1, further comprising maneuvering the robot to avoid the object.

5. The method of claim 1, further comprising:
   assessing a weight for each particle based on the images;
   selecting at least one particle based on its weight; and
   determining a location of the robot based on the at least one selected particle.

6. The method of claim 1, wherein the three-dimensional depth data of each image comprises a three-dimensional point cloud.

7. The method of claim 6, further comprising accumulating cloud points of the three-dimensional point cloud of each image in cells of the occupancy grid map based on first and second coordinates of the cloud points, each cell accumulating a height variance based on a third coordinate of the cloud points.

8. The method of claim 1, further comprising calculating a Harris Corner Score to identify feature points associated with a corner feature of the scene.

9. The method of claim 8, further comprising selecting feature points as candidate feature points that have at least one of a local maximum Harris Corner Score or a Harris Corner Score substantially equal to the local maximum Harris Corner Score in a threshold area.

10. The method of claim 9, further comprising selecting feature points as candidate feature points that have at least one of a local maximum Harris Corner Score or a Harris Corner Score within about 20% of the local maximum Harris Corner Score within a 10 pixel radius of the feature point having the local maximum Harris Corner Score.

11. The method of claim 1, further comprising selecting a feature point of a scaled image as a key point for tracking and producing a descriptor of that key point.

12. The method of claim 11, further comprising identifying the key point in a subsequent image using the descriptor.

13. The method of claim 11, wherein the descriptor comprises feature points within a threshold distance of the key point on the corresponding scaled image of the key point.

14. The method of claim 13, further comprising:
sampling feature points of the descriptor;
recording a brightness level for each feature point; and
normalizing the brightness levels to have a mean of zero and a variance of one.

15. The method of claim 14, further comprising, before sampling the feature points, at least one of:
blurring the scaled image before sampling the feature points; or
rotating the feature points by a threshold angle.

16. The method of claim 14, further comprising sampling feature points within a threshold area of the scaled image about the key point.

17. The method of claim 14, further comprising:
producing a descriptor for each feature point of a set of feature points;
comparing feature descriptors of first and second images to identify a common feature point; and
searching respective image pyramids of the first and second images to find the common feature point.

18. The method of claim 17, further comprising searching within a threshold area of the scaled images of the images pyramids for the common feature point.

19. The method of claim 17, further comprising determining the threshold area based on at least one of a known previous feature point location or a robot drive trajectory.

* * * * *